US010394810B1

(12) United States Patent
Lu

(10) Patent No.: US 10,394,810 B1
(45) Date of Patent: Aug. 27, 2019

(54) ITERATIVE Z-SCORE CALCULATION FOR BIG DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 816 days.

(21) Appl. No.: 14/980,680

(22) Filed: Dec. 28, 2015

Related U.S. Application Data

(60) Provisional application No. 62/115,152, filed on Feb. 12, 2015.

(51) Int. Cl.
*G06F 17/18* (2006.01)
*G06F 16/2453* (2019.01)

(52) U.S. Cl.
CPC .......... *G06F 16/2453* (2019.01); *G06F 17/18* (2013.01)

(58) Field of Classification Search
CPC . G06F 17/30442; G06F 17/18; G06F 16/2453
USPC ........................................................ 707/719
See application file for complete search history.

(56) References Cited

U.S. PATENT DOCUMENTS

| 7,747,413 | B2 | 6/2010 | Ramsey et al. | |
|---|---|---|---|---|
| 7,840,377 | B2 | 11/2010 | Ramsey et al. | |
| 9,069,726 | B2 | 6/2015 | Lu | |
| 2003/0078924 | A1* | 4/2003 | Liechty | ................... G06F 17/18 |
| 2005/0112689 | A1* | 5/2005 | Kincaid | ................... G06F 19/24 |
| | | | | 435/7.1 |
| 2008/0215402 | A1* | 9/2008 | Pearson | ................ G06Q 10/10 |
| | | | | 705/2 |
| 2011/0106743 | A1* | 5/2011 | Duchon | ............ G06F 17/30705 |
| | | | | 706/46 |
| 2014/0164456 | A1 | 6/2014 | Lu | |
| 2014/0324391 | A1* | 10/2014 | Moutafi | ................. G06F 17/17 |
| | | | | 702/189 |

FOREIGN PATENT DOCUMENTS

| WO | WO-2014093540 A2 | 6/2014 |
|---|---|---|
| WO | WO-2014093540 A3 | 9/2014 |

* cited by examiner

Primary Examiner — Hosain T Alam
Assistant Examiner — Saba Ahmed

(57) ABSTRACT

The present invention extends to methods, systems, and computing system program products for iteratively calculating a Z-score for Big Data. Embodiments of the invention include iteratively calculating one or more components of a Z-score for a modified computation subset based on the one or more components of a Z-score calculated for a previous computation subset and then calculating a Z-score for a selected data element in the modified computation subset based on one or more of the iteratively calculated components. Iteratively calculating a Z-score avoids visiting all data elements in the modified computation subset and performing redundant computations thereby increasing calculation efficiency, saving computing resources and reducing computing system's power consumption.

20 Claims, 23 Drawing Sheets

The Definitions of Z-score:

Suppose computation subset $X$ composes of $n$ data elements: $X = \{x_i | i = 1, \ldots, n\}$ which is a subset of a Big Data set.

Define the sum of the computation subset $X$ with size $n$ in the $k^{th}$ iteration as below:

$$S_k = x_1 + x_2 + x_3 + \cdots + x_n = \sum_1^n x_i \qquad \sim 401$$

Define the mean of the computation subset $X$ with size $n$ in the $k^{th}$ iteration as below:

$$\bar{x}_k = \frac{(x_1 + x_2 + x_3 + \cdots + x_n)}{n} = \frac{\sum_1^n x_i}{n} \qquad \sim 402$$

The Z-score of a selected data element $x_m$ ($1 \leq m \leq n$) in the computation subset $X$ with size $n$ in the $k^{th}$ iteration is defined as:

$$Z_k(x_m) = \frac{x_m - \bar{x}_k}{\sqrt[2]{\frac{1}{n}\sum_1^n (x_i - \bar{x}_k)^2}} \qquad \sim 403$$

Suppose the Z-score of a selected data element $x_m$ in a modified computation subset $X$ with a fixed size $n$ needs to be calculated again after an existing data element $x_r$ ($1 \leq r \leq n$) in $X$ is removed and a data element $x_a$ is added.

Define the sum of the modified computation subset $X$ with size $n$ in the $k+1^{th}$ iteration as below:

$$S_{k+1} = x_1 + x_2 + \cdots + x_n + x_a - x_r = \sum_1^n x_i + x_a - x_r \qquad \sim 404$$

Define the mean of the modified computation subset $X$ with size $n$ in the $k+1^{th}$ iteration as below:

$$\bar{x}_{k+1} = \frac{(x_1 + x_2 + \cdots + x_n + x_a - x_r)}{n} = \frac{\sum_1^n x_i + x_a - x_r}{n} \qquad \sim 405$$

The Z-score of a selected data element $x_m$ ($m = a$ or $1 \leq m \leq n$) in the modified computation subset $X$ with size $n$ in the $k+1^{th}$ iteration is defined as:

$$Z_{k+1}(x_m) = \frac{x_m - \bar{x}_{k+1}}{\sqrt[2]{\frac{1}{n}(\sum_1^n (x_i - \bar{x}_{k+1})^2 + (x_a - \bar{x}_{k+1})^2 - (x_r - \bar{x}_{k+1})^2)}} \qquad \sim 406$$

Fig. 4A

Some Example Components of a Z-score:

- $S_k = \sum_1^n x_i$
- $\bar{x}_k = \frac{1}{n}\sum_1^n x_i$
- $SS_k = \sum_1^n x_i^2$
- $SSD_k = \sum_1^n (x_i - \bar{x}_k)^2$
- $vp_k = \frac{1}{n}\sum_1^n (x_i - \bar{x}_k)^2$
- $\sigma_k = \sqrt{\frac{1}{n}\sum_1^n (x_i - \bar{x}_k)^2}$
- $Z_k(x_m) = \frac{x_m - \bar{x}_k}{\sigma_k} = \frac{x_m - \bar{x}_k}{\sqrt[2]{\frac{1}{n}\sum_1^n (x_i - \bar{x}_k)^2}}$ Basic Iterative Component Calculation Equations:

The sum and/or a mean of the data elements in a computation subset will be used by several examples of iterative algorithms, so put their calculation equations here instead of in each iterative algorithms.

According to equation 401 and equation 404, $S_{k+1}$ may be calculated in an iterative way:

$$S_{k+1} = S_k + x_a - x_r \quad \sim\!\!\_407$$

According to equation 402 and equation 405, $\bar{x}_{k+1}$ may be calculated in an iterative way:

$$\bar{x}_{k+1} = \bar{x}_k + \frac{(x_a - x_r)}{n} \quad \sim\!\!\_408$$

Fig. 4B

Iterative Algorithm 1:

Population variance $vp_k = \frac{1}{n}\sum_1^n(x_i - \bar{x}_k)^2$ is a component of a Z-score. Population variance $vp_{k+1}$ may be iteratively calculated based on population variance $vp_k$ in previous moving computation window and another component $S_{k+1}$ or $\bar{x}_{k+1}$ defined in Figure 4A and Figure 4B.

$$vp_k = \frac{1}{n}\sum_1^n(x_i - S_k/n)^2 = \frac{1}{n}\sum_1^n(x_i - \bar{x}_k)^2 \qquad \sim\!\!\_409$$

$$vp_{k+1} = \frac{1}{n}(\sum_1^n(x_i - \bar{x}_{k+1})^2 + (x_a - \bar{x}_{k+1})^2 - (x_r - \bar{x}_{k+1})^2) \qquad \sim\!\!\_410$$

Once $vp_k$ is calculated, $vp_{k+1}$ in the k+1$^{th}$ iteration may be directly iteratively calculated by $$vp_{k+1} = vp_k + \frac{1}{n}((x_a + x_r - (S_{k+1} + S_k)/n)(x_a - x_r)) = vp_k + \frac{1}{n}\Big((x_a + x_r - (\bar{x}_{k+1} + \bar{x}_k))(x_a - x_r)\Big) \qquad \sim\!\!\_411$$

Once population variance $vp_k$ is calculated, then Z-score of a selected data element $x_m$ in the k$^{th}$ iteration may be calculated by $$Z_k(x_m) = \frac{x_m - S_k/n}{\sqrt[2]{vp_k}} = \frac{x_m - \bar{x}_k}{\sqrt[2]{vp_k}} \qquad \sim\!\!\_412$$

Once population variance $vp_{k+1}$ is calculated, then Z-score of a selected data element $x_m$ in the k+1$^{th}$ iteration may be calculated by $$Z_{k+1}(x_m) = \frac{x_m - S_{k+1}/n}{\sqrt[2]{vp_{k+1}}} = \frac{x_m - \bar{x}_{k+1}}{\sqrt[2]{vp_{k+1}}} \qquad \sim\!\!\_413$$

Fig. 4C

Iterative Algorithm 2:

$\sum_1^n(x_i - \bar{x}_k)^2$ is a component of a Z-score. $\sum_1^n(x_i - \bar{x}_k)^2$ may be iteratively calculated based on another component $S_{k+1}$ or $\bar{x}_{k+1}$ defined in Figure 4A and Figure 4B.

$$SSD_k = \sum_1^n(x_i - \bar{x}_k)^2 \qquad 414$$

$$SSD_{k+1} = \sum_1^n(x_i - \bar{x}_{k+1})^2 + (x_a - \bar{x}_{k+1})^2 - (x_r - \bar{x}_{k+1})^2 \qquad 415$$

then $SSD_{k+1}$ may be iteratively calculated.

$$SSD_{k+1} = SSD_k + (x_a - x_r)\big((x_a + x_r) - (S_k + S_{k+1})/n\big) = SSD_k + (x_a - x_r)\big((x_a + x_r) - (\bar{x}_k + \bar{x}_{k+1})\big) \qquad 416$$

Once $SSD_k$ is calculated, Z-score of a selected data element $x_m$ in the $k^{th}$ iteration may be calculated by $$Z_k(x_m) = \frac{n \cdot x_m - S_k}{\sqrt[2]{n \cdot SSD_k}} = \frac{x_m - \bar{x}_k}{\sqrt[2]{\frac{SSD_k}{n}}} \qquad 417$$

Once $SSD_{k+1}$ is calculated, Z-score of a selected data element $x_m$ in the $k+1^{th}$ iteration may be calculated by $$Z_{k+1}(x_m) = \frac{n \cdot x_m - S_{k+1}}{\sqrt[2]{n \cdot SSD_{k+1}}} = \frac{x_m - \bar{x}_{k+1}}{\sqrt[2]{\frac{SSD_{k+1}}{n}}} \qquad 418$$

Fig. 4D

Iterative Algorithm 3:

A Z-score may be calculated based on components $SS_{k+1}$ defined below and $S_{k+1}$ or $\bar{x}_{k+1}$ defined in Figure 4A and Figure 4B.

$$SS_k = \sum_1^n x_i^2 \qquad \sim\!\!\_419$$

$$SS_{k+1} = \sum_1^n x_i^2 + x_a^2 - x_r^2 \qquad \sim\!\!\_420$$

$SS_{k+1}$ may be calculated in an iterative way:

$$SS_{k+1} = SS_k + x_a^2 - x_r^2 \qquad \sim\!\!\_421$$

Once $S_k$ or $\bar{x}_k$ and $SS_k$ are calculated, Z-score of a selected data element $x_m$ in the $k^{th}$ iteration may be calculated by $$Z_k(x_m) = \frac{n \cdot x_m - S_k}{2\sqrt{n \cdot SS_k - S_k^2}} = \frac{x_m - \bar{x}_k}{2\sqrt{\frac{SS_k - \bar{x}_k S_k}{n}}} = \frac{x_m - \bar{x}_k}{2\sqrt{\frac{SS_k}{n} - \bar{x}_k^2}} \qquad \sim\!\!\_422$$

Once $S_{k+1}$ or $\bar{x}_{k+1}$ and $SS_{k+1}$ are calculated, Z-score of a selected data element $x_m$ in the $k+1^{th}$ iteration may be calculated by $$Z_{k+1}(x_m) = \frac{n \cdot x_m - S_{k+1}}{2\sqrt{n \cdot SS_{k+1} - S_{k+1}^2}} = \frac{x_m - \bar{x}_{k+1}}{2\sqrt{\frac{SS_{k+1} - \bar{x}_{k+1} S_{k+1}}{n}}} = \frac{x_m - \bar{x}_{k+1}}{2\sqrt{\frac{SS_{k+1}}{n} - \bar{x}_{k+1}^2}} \qquad \sim\!\!\_423$$

Fig. 4E

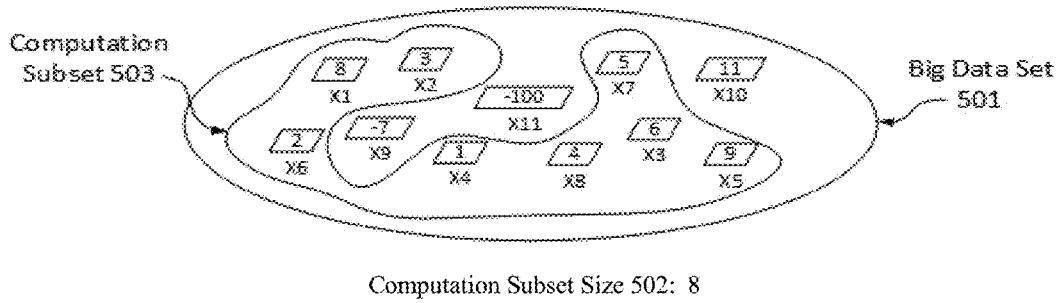

Computation Subset Size 502: 8

Calculate Z-score of $x_8$ in Computation Subset 503

Traditional Algorithm:

1. Use equation 402 to calculate $\bar{x}_1$ of computation subset 503 for the 1st iteration:

$$\bar{x}_1 = \frac{8+3+6+1+9+2+5+4}{8} = \frac{38}{8} = 4.75$$

Operations in this step: 1 division, 7 additions

2. Calculate $\frac{1}{8}\sum_{1}^{8}(x_i - \bar{x}_1)^2$ for the 1st iteration:

$$\frac{1}{8}\sum_{1}^{8}(x_i - \bar{x}_1)^2 = \frac{1}{8}((8-4.75)^2 + (3-4.75)^2 + (6-4.75)^2 + (1-4.75)^2 + (9-4.75)^2 +$$
$$(2-4.75)^2 + (5-4.75)^2 + (4-4.75)^2) = \frac{1}{8}(10.5625 + 3.0625 + 1.5625 + 14.0625 +$$
$$18.0625 + 7.5625 + 0.0625 + 0.5625) = \frac{1}{8} \times 55.5 = 6.9375$$

Operations in this step: 1 division, 8 multiplications, 7 additions, 8 subtractions 3. Use equation 403 to calculate the Z-score of $x_8$ for the 1st iteration:

$$Z_1(x_8) = \frac{x_8 - \bar{x}_1}{\sqrt[2]{\frac{1}{8}\sum_{1}^{8}(x_i-\bar{x}_1)^2}} = \frac{4-4.75}{\sqrt[2]{6.9375}} = \frac{-0.75}{2.6339134382131847} = -0.2847473987257497$$

Operations in this step: 1 square root, 1 division, 1 subtraction

There are a total of 1 square root, 3 divisions, 8 multiplications, 14 additions and 9 subtractions.

Fig. 5A

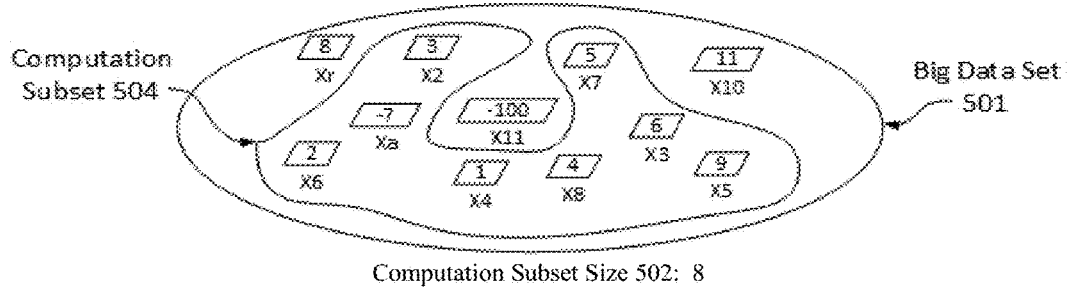

Computation Subset Size 502: 8

Calculate Z-score of $x_8$ in Computation Subset 504

Traditional Algorithm:

1. Use equation 402 alculate $\bar{x}_2$ of computation subset 504 for the 2$^{nd}$ iteration:

$$\bar{x}_2 = \frac{3+6+1+9+2+5+4+(-7)}{8} = \frac{23}{8} = 2.875$$

Operations in this step: 1 division, 7 additions

2. Calculate $\frac{1}{8}(\sum_{2}^{8}(x_i - \bar{x}_2)^2 + (x_a - \bar{x}_2)^2)$ for the 2$^{nd}$ iteration:

$\frac{1}{8}(\sum_{2}^{8}(x_i - \bar{x}_2)^2 + (x_a - \bar{x}_2)^2) = \frac{1}{8}((3 - 2.875)^2 + (6 - 2.875)^2 + (1 - 2.875)^2 + (9 - 2.875)^2 +$
$(2 - 2.875)^2 + (5 - 2.875)^2 + (4 - 2.875)^2) + (-7 - 2.875)^2 = \frac{1}{8}(0.015625 + 9.765625 +$
$3.515625 + 37.515625 + 0.765625 + 4.515625 + 1.265625 + 97.515625) = \frac{1}{8} \times 154.875 =$
$19.359375$ Operations in this step: 1 division, 8 multiplications, 7 additions, 8 subtractions 3. Use equation 403 to calculate the $Z_2(x_8)$ for the 2$^{nd}$ iteration:

$$Z_2(x_8) = \frac{x_8 - \bar{x}_2}{\sqrt[2]{\frac{1}{8}(\sum_{2}^{8}(x_i - \bar{x}_2)^2 + (x_a - \bar{x}_2)^2)}} = \frac{4 - 2.875}{\sqrt[2]{19.359375}} = \frac{1.125}{4.3999289766995103} = 0.255685945377211$$

Operations in this step: 1 square root, 1 division, 1 subtraction

There are also a total of 1 square root, 3 divisions, 8 multiplications, 14 additions and 9 subtractions.

Fig. 5A Cont'd 1

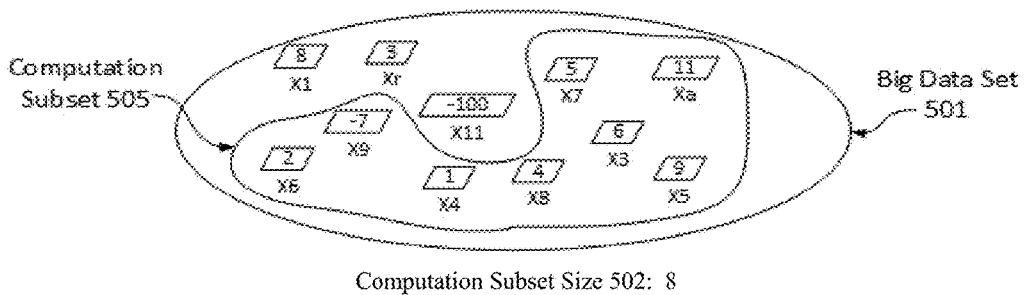

Computation Subset Size 502: 8

<u>Calculate Z-score of $x_8$ in Computation Subset 505</u>

Traditional Algorithm:

1. Use equation 402 to calculate $\bar{x}_3$ of computation subset 505 for the 3<sup>rd</sup> iteration:

$$\bar{x}_3 = \frac{6+1+9+2+5+4+(-7)+11}{8} = \frac{31}{8} = 3.875$$

Operations in this step: 1 division, 7 additions

2. Calculate $\frac{1}{8}(\sum_3^9(x_i - \bar{x}_3)^2 + (x_a - \bar{x}_3)^2)$ for the 3<sup>rd</sup> iteration:

$\frac{1}{8}(\sum_3^9(x_i - \bar{x}_3)^2 + (x_a - \bar{x}_3)^2) = \frac{1}{8}((6 - 3.875)^2 + (1 - 3.875)^2 + (9 - 3.875)^2 + (2 - 3.875)^2 +$
$(5 - 3.875)^2 + (4 - 3.875)^2) + (-7 - 3.875)^2 + (11 - 3.875)^2 = \frac{1}{8}(4.515625 + 8.265625 +$
$26.265625 + 3.515625 + 1.265625 + 0.015625 + 118.265625 + 50.765625) = \frac{1}{8} \times 212.875 =$
$26.609375$ Operations in this step: 1 division, 8 multiplications, 7 additions, 8 subtractions 3. Use equation 403 to calculate the Z-score of $x_8$ for the 3<sup>rd</sup> iteration:

$$Z_3(x_8) = \frac{x_8 - \bar{x}_3}{\sqrt[2]{\frac{1}{8}(\sum_3^9(x_i-\bar{x}_3)^2+(x_a-\bar{x}_3)^2)}} = \frac{4-3.875}{\sqrt[2]{26.609375}} = \frac{0.125}{5.1584275704908371} = 0.0242321905836328$$

Operations in this step: 1 square root, 1 division, 1 subtraction

There are also a total of 1 square root, 3 divisions, 8 multiplications, 14 additions and 9 subtractions.

For number of $n$ data elements, traditional algorithms typically use 1 square root, 3 divisions, $n$ multiplications, $2(n-1)$ additions and $n+1$ subtractions when calculating Z-score of a data element.

Fig. 5A Cont'd 2

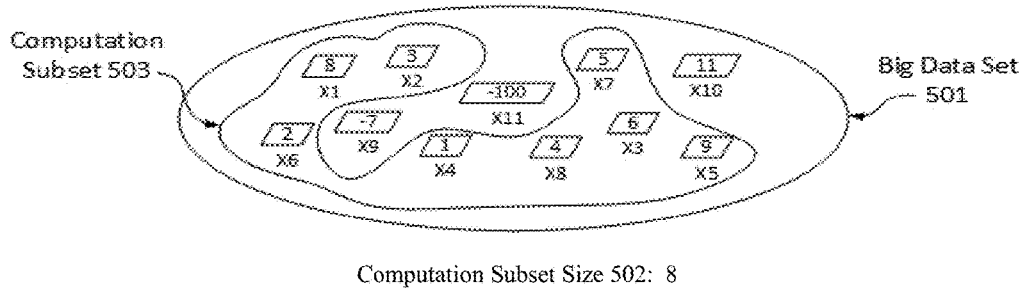

Computation Subset Size 502: 8

Calculate Z-score of $x_8$ in Computation Subset 503

Iterative Algorithm 1:

1. Use equation 402 to initially calculate $\bar{x}_1$ of computation subset 503 for the 1st iteration:

$$\bar{x}_1 = \frac{8+3+6+1+9+2+5+4}{8} = \frac{38}{8} = 4.75$$

Operations in this step: 1 division, 7 additions

2. Use equation 409 to initially calculate the population variance $vp_1$ for the 1st iteration:

$$vp_1 = \frac{1}{8}\sum_1^8(x_i - \bar{x}_1)^2 = \frac{1}{8-1}((8-4.75)^2 + (3-4.75)^2 + (6-4.75)^2 + (1-4.75)^2 +$$
$$(9-4.75)^2 + (2-4.75)^2 + (5-4.75)^2 + (4-4.75)^2) = \frac{1}{8}(10.5625 + 3.0625 + 1.5625 +$$
$$14.0625 + 18.0625 + 7.5625 + 0.0625 + 0.5625) = \frac{1}{8} \times 55.5 = 6.9375$$

Operations in this step: 1 division, 8 multiplications, 7 additions, 8 subtractions 3. Use equation 412 to initially calculate the Z-score of $x_8$ for the 1st iteration:

$$Z_1(x_8) = \frac{x_8 - \bar{x}_1}{\sqrt[2]{vp_1}} = \frac{4-4.75}{\sqrt[2]{6.9375}} = \frac{-0.75}{2.6339134382131847} = -0.2847473987257497$$

Operations in this step: 1 square root, 1 division, 1 subtraction

There are a total of 1 square root, 3 divisions, 8 multiplications, 14 additions and 9 subtractions when initially calculating the Z-score of $x_8$ in computation subset 503.

Fig. 5B

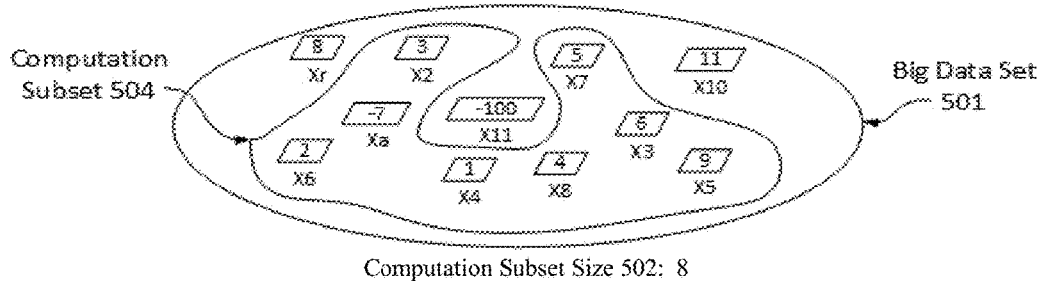

Computation Subset Size 502: 8

<u>Calculate Z-score of $x_8$ in Computation Subset 504</u>

Iterative Algorithm 1:

1. Use equation 408 to directly iteratively calculate $\bar{x}_2$ for the 2$^{nd}$ iteration:

$$\bar{x}_2 = \bar{x}_1 + \frac{(x_a - x_r)}{8} = 4.75 + \frac{(-7-8)}{8} = 4.75 - \frac{15}{8} = 2.875$$

Operations in this step: 1 division, 1 addition, 1 subtraction

2. Use equation 411 to directly iteratively calculate population variance $vp_2$ for the 2$^{nd}$ iteration:

$$vp_2 = vp_1 + \frac{(x_a + x_r - (\bar{x}_2 + \bar{x}_1))(x_a - x_r)}{8} = 6.9375 + \frac{(-7+8-(2.875+4.75))(-7-8)}{8} = 6.9375 + \frac{(1-7.625)(-15)}{8} = 6.9375 + \frac{(-6.625)(-15)}{8} = 6.9375 + \frac{99.375}{8} = 6.9375 + 12.421875 = 19.359375$$

Operations in this step: 1 division, 1 multiplication, 3 additions, 2 subtractions 3. Use equation 413 to indirectly iteratively calculate the Z-score of $x_8$ for the 2$^{nd}$ iteration:

$$Z_2(x_8) = \frac{x_8 - \bar{x}_2}{\sqrt[2]{vp_2}} = \frac{4 - 2.875}{\sqrt[2]{19.359375}} = \frac{1.125}{4.3999289766995103} = 0.2556859453772113$$

Operations in this step: 1 square root, 1 division, 1 subtraction

There are a total of 1 square root, 3 divisions, 1 multiplication, 4 additions and 4 subtractions when iteratively calculating the Z-score of $x_8$ in computation subset 504.

Fig. 5B Cont'd 1

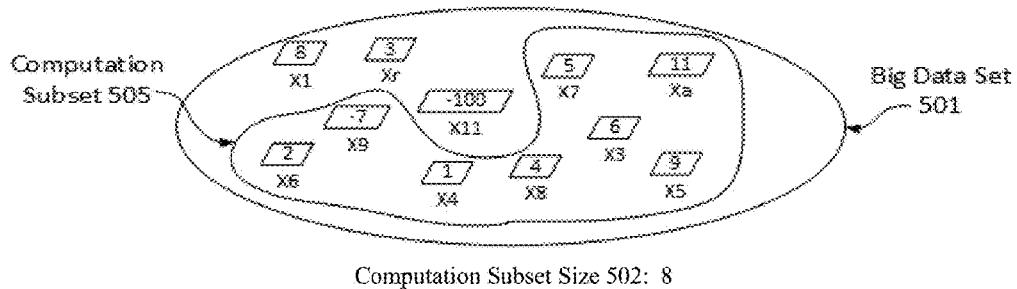

Computation Subset Size 502: 8

<u>Calculate Z-score of $x_8$ in Computation Subset 505</u>

Iterative Algorithm 1:

1. Use equation 408 to directly iteratively calculate $\bar{x}_3$ for the 3<sup>rd</sup> iteration:

$$\bar{x}_3 = \bar{x}_2 + \frac{(x_a - x_r)}{8} = 2.875 + \frac{(11-3)}{8} = 2.875 + \frac{8}{8} = 3.875$$

Operations in this step: 1 division, 1 addition, 1 subtraction

2. Use equation 411 to directly iteratively calculate population variance $vp_3$ for the 3<sup>rd</sup> iteration:

$$vp_3 = vp_2 + \frac{(x_a + x_r - (\bar{x}_3 + \bar{x}_2))(x_a - x_r)}{8} = 19.359375 + \frac{(11+3-(3.875+2.875))(11-3)}{8} = 19.359375 + \frac{(14-6.75)(8)}{8} = 19.359375 + \frac{(7.25)(8)}{8} = 26.609375$$

Operations in this step: 1 division, 1 multiplication, 3 additions, 2 subtractions 3. Use equation 413 to indirectly iteratively calculate the Z-score of $x_8$ for the 3<sup>rd</sup> iteration:

$$Z_3(x_8) = \frac{x_8 - \bar{x}_3}{\sqrt[2]{vp_3}} = \frac{4 - 3.875}{\sqrt[2]{26.609375}} = \frac{0.125}{5.1584275704908371} = 0.0242321905836328$$

Operations in this step: 1 square root, 1 division, 1 subtraction

There are also a total of 1 square root, 3 divisions, 1 multiplication, 4 additions and 4 subtractions when iteratively calculating the Z-score of $x_8$ in computation subset 505.

Fig. 5B Cont'd 2

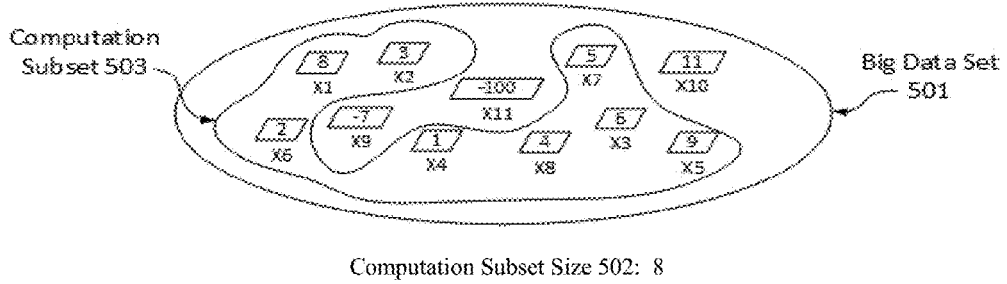

Computation Subset Size 502: 8

Calculate Z-score of $x_8$ in Computation Subset 503

Iterative Algorithm 2:

1. Use equation 402 to initially calculate $\bar{x}_1$ of computation subset 503 for the 1ˢᵗ iteration:

$$\bar{x}_1 = \frac{8+3+6+1+9+2+5+4}{8} = \frac{38}{8} = 4.75$$

Operations in this step: 1 division, 7 additions

2. Use equation 414 to initially calculate $SSD_1 = \sum_1^8 (x_i - \bar{x}_1)^2$ for the 1ˢᵗ iteration:

$$SSD_1 = \sum_1^8 (x_i - \bar{x}_1)^2 = ((8 - 4.75)^2 + (3 - 4.75)^2 + (6 - 4.75)^2 + (1 - 4.75)^2 + (9 - 4.75)^2 + (2 - 4.75)^2 + (5 - 4.75)^2 + (4 - 4.75)^2) = (10.5625 + 3.0625 + 1.5625 + 14.0625 + 18.0625 + 7.5625 + 0.0625 + 0.5625) = 55.5$$

Operations in this step: 8 multiplications, 7 additions, 8 subtractions

3. Use equation 417 to initially calculate the Z-score of $x_8$ for the 1ˢᵗ iteration:

$$Z_1(x_8) = \frac{x_8 - \bar{x}_1}{\sqrt[2]{\frac{SSD_1}{8}}} = \frac{4 - 4.75}{\sqrt[2]{\frac{55.5}{8}}} = \frac{-0.75}{\sqrt[2]{6.9375}} = \frac{-0.75}{2.6339134382131847} = -0.2847473987257497$$

Operations in this step: 1 square root, 2 divisions, 1 subtraction

There are a total of 1 square root, 3 divisions, 8 multiplications, 14 additions and 9 subtractions when initially calculating the Z-score of $x_8$ in computation subset 503.

Fig. 5C

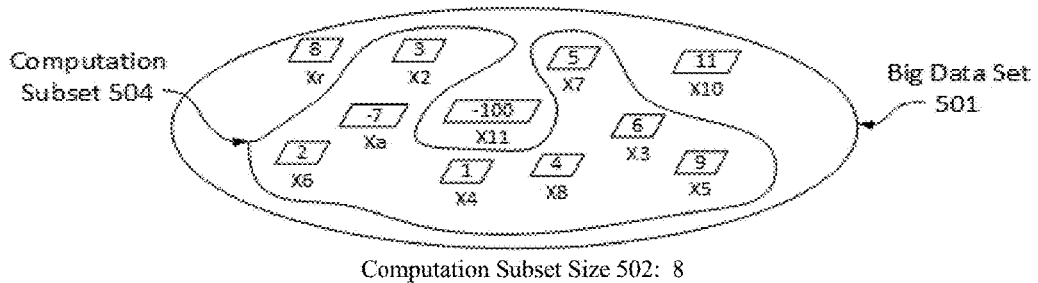

Computation Subset Size 502: 8

<u>Calculate Z-score of $x_8$ in Computation Subset 504</u>

Iterative Algorithm 2:

1. Use equation 408 to iteratively calculate $\bar{x}_2$ for the 2$^{nd}$ iteration:

$$\bar{x}_2 = \bar{x}_1 + \frac{(x_a - x_r)}{8} = 4.75 + \frac{(-7-8)}{8} = 2.875$$

Operations in this step: 1 division, 1 addition, 1 subtraction

2. Use equation 416 to directly iteratively calculate $SSD_2$ for the 2$^{nd}$ iteration:

$$SSD_2 = SSD_1 + \left((x_a + x_r - (\bar{x}_2 + \bar{x}_1))(x_a - x_r)\right) = 55.5 + \left((-7 + 8 - (2.875 + 4.75))(-7 - 8)\right) = 55.5 + \left((1 - 7.625)(-15)\right) = 55.5 + \left((-6.625)(-15)\right) = 154.875$$

Operations in this step: 1 multiplication, 3 additions, 2 subtractions

3. Use equation 418 to indirectly iteratively calculate the Z-score of $x_8$ for the 2$^{nd}$ iteration:

$$Z_2(x_8) = \frac{x_8 - \bar{x}_2}{2\sqrt{\frac{SSD_2}{n}}} = \frac{4 - 2.875}{2\sqrt{\frac{154.875}{8}}} = \frac{1.125}{2\sqrt{19.359375}} = \frac{1.125}{4.3999289766995103} = 0.2556859453772113$$

Operations in this step: 1 square root, 2 divisions, 1 subtraction

There are a total of 1 square root, 3 divisions, 1 multiplication, 4 additions and 4 subtractions when iteratively calculating the Z-score of $x_8$ in computation subset 504.

Fig. 5C Cont'd 1

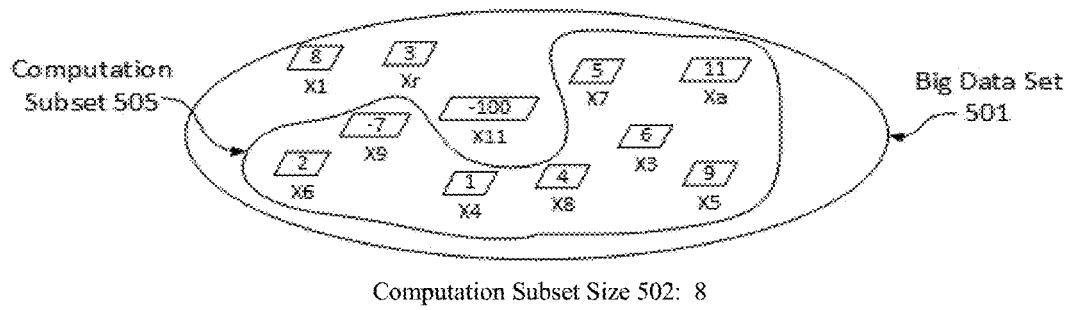

Computation Subset Size 502: 8

Calculate Z-score of $x_8$ in Computation Subset 505

Iterative Algorithm 2:

1. Use equation 408 to directly iteratively calculate $\bar{x}_3$ for the 3rd iteration:

$$\bar{x}_3 = \bar{x}_2 + \frac{(x_a - x_r)}{8} = 2.875 + \frac{(11-3)}{8} = 2.875 + \frac{8}{8} = 3.875$$

Operations in this step: 1 division, 1 addition, 1 subtraction

2. Use equation 416 to directly iteratively calculate $SSD_3$ for the 3rd iteration:

$$SSD_3 = SSD_2 + \left((x_a + x_r - (\bar{x}_3 + \bar{x}_2))(x_a - x_r)\right) = 154.875 + \left((11 + 3 - (3.875 + 2.875))(11 - 3)\right) = 154.875 + \left((14 - 6.75)(8)\right) = 212.875$$

Operations in this step: 1 multiplication, 3 additions, 2 subtractions

3. Use equation 418 to indirectly iteratively calculate the Z-score of $x_8$ for the 3rd iteration:

$$Z_3(x_8) = \frac{x_8 - \bar{x}_3}{2\sqrt{\frac{SSD_3}{n}}} = \frac{4 - 3.875}{2\sqrt{\frac{212.875}{8}}} = \frac{0.125}{2\sqrt{26.609375}} = \frac{0.125}{5.1584275704908371} = 0.0242321905836328$$

Operations in this step: 1 square root, 2 divisions, 1 subtraction

There are a total of 1 square root, 3 divisions, 1 multiplication, 4 additions and 4 subtractions when iteratively calculating the Z-score of $x_8$ in computation subset 505.

Fig. 5C Cont'd 2

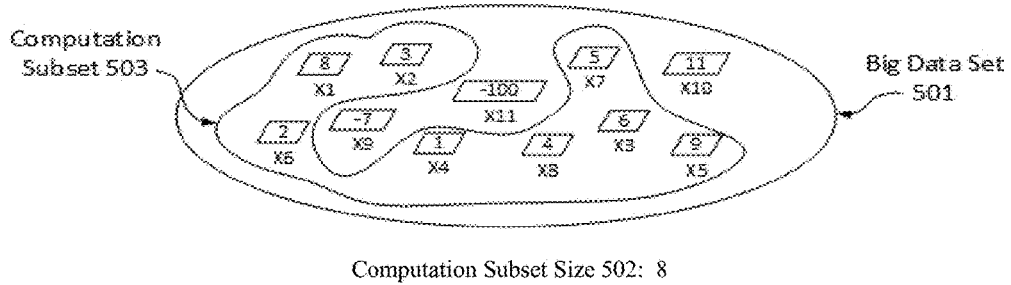

Computation Subset Size 502: 8

Calculate Z-score of $x_8$ in Computation Subset 503

Iterative Algorithm 3:

1. Use equation 402 to initially calculate $\bar{x}_1$ of computation subset 502 for the 1st iteration:

$$\bar{x}_1 = \frac{8+3+6+1+9+2+5+4}{8} = \frac{38}{8} = 4.75$$

Operations in this step: 1 division, 7 additions

2. Use equation 419 to initially calculate $SS_1 = \sum_1^8 x_i^2$ for the 1st iteration:

$$SS_1 = \sum_1^8 x_i^2 = 8^2 + 3^2 + 6^2 + 1^2 + 9^2 + 2^2 + 5^2 + 4^2 = 64 + 9 + 36 + 1 + 81 + 4 + 25 + 16 = 236$$

Operations in this step: 8 multiplications, 7 additions

3. Use equation 422 to initially calculate the Z-score of $x_8$ for the 1st iteration:

$$Z_1(x_8) = \frac{x_8 - \bar{x}_1}{\sqrt[2]{\frac{SS_1}{n} - \bar{x}_1^2}} = \frac{4 - 4.75}{\sqrt[2]{\frac{236}{8} - 4.75^2}} = \frac{-0.75}{\sqrt[2]{29.5 - 22.5625}} = \frac{-0.75}{\sqrt[2]{6.9375}} = \frac{-0.75}{2.6339134382131847} = -0.2847473987257497$$

Operations in this step: 1 square root, 2 divisions, 2 subtractions

There are a total of 1 square root, 3 divisions, 8 multiplications, 14 additions and 2 subtractions when initially calculating the Z-score of $x_8$ in computation subset 503.

Fig. 5D

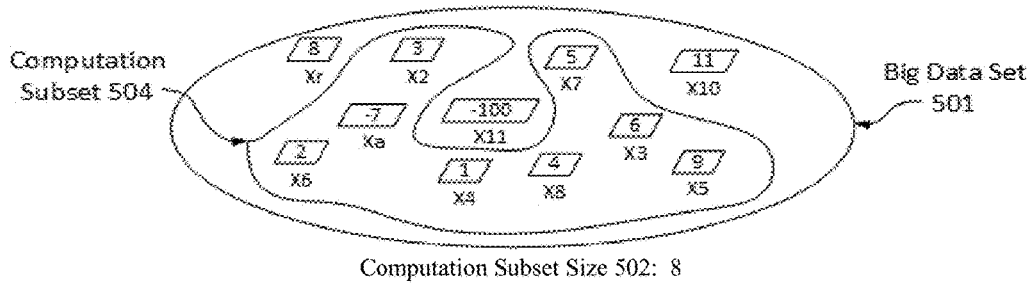

Computation Subset Size 502: 8

Calculate Z-score of $x_8$ in Computation Subset 504

Iterative Algorithm 3:

1. Use equation 408 to directly iteratively calculate $\bar{x}_2$ for the 2$^{nd}$ iteration:

$$\bar{x}_2 = \bar{x}_1 + \frac{(x_a - x_r)}{8} = 4.75 + \frac{(-7-8)}{8} = 4.75 - \frac{15}{8} = 2.875$$

Operations in this step: 1 division, 1 addition, 1 subtraction

2. Use equation 421 to directly iteratively calculate $SS_2$ for the 2$^{nd}$ iteration:

$$SS_2 = SS_1 + x_a^2 - x_r^2 = 236 + (-7)^2 - 8^2 = 236 + 49 - 64 = 221$$

Operations in this step: 2 multiplications, 1 addition, 1 subtraction

3. Use equation 423 to indirectly iteratively calculate the Z-score of $x_8$ for the 2$^{nd}$ iteration:

$$Z_2(x_8) = \frac{x_8 - \bar{x}_2}{\sqrt[2]{\frac{SS_2}{n} - \bar{x}_2^2}} = \frac{4 - 2.875}{\sqrt[2]{\frac{221}{8} - 2.875^2}} = \frac{1.125}{\sqrt[2]{27.625 - 8.265625}} = \frac{1.125}{\sqrt[2]{19.359375}} = \frac{1.125}{4.3999289766995103} =$$
0.2556859453772113

Operations in this step: 1 square root, 2 divisions, 1 multiplication, 2 subtractions There are a total of 1 square root, 3 divisions, 3 multiplications, 2 additions and 4 subtractions when iteratively calculating the Z-score of $x_8$ in computation subset 504.

Fig. 5D Cont'd 1

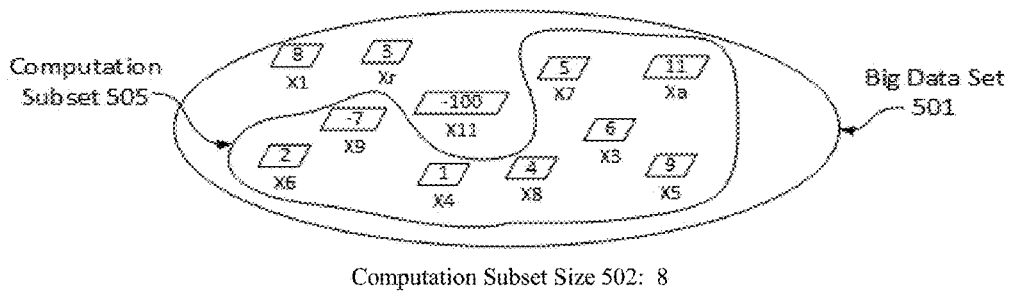

Computation Subset Size 502: 8

<u>Calculate Z-score of $x_8$ in Computation Subset 505</u>

Iterative Algorithm 3:

1. Use equation 414 to iteratively calculate $\bar{x}_3$ for the 3$^{rd}$ iteration:

$$\bar{x}_3 = \bar{x}_2 + \frac{(x_a - x_r)}{8} = 2.875 + \frac{(11-3)}{8} = 2.875 + \frac{8}{8} = 3.875$$

Operations in this step: 1 division, 1 addition, 1 subtraction

2. Use equation 426 to iteratively calculate $SS_3$ for the 3$^{rd}$ iteration:

$$SS_3 = SS_2 + x_a{}^2 - x_r{}^2 = 221 + 11^2 - 3^2 = 333$$

Operations in this step: 2 multiplications, 1 addition, 1 subtraction

3. Use equation 427 to calculate the Z-score of $x_8$ for the 3$^{rd}$ iteration:

$$Z_3(x_8) = \frac{x_8 - \bar{x}_3}{\sqrt[2]{\frac{SS_3}{n} - \bar{x}_3{}^2}} = \frac{4 - 3.875}{\sqrt[2]{\frac{333}{8} - 3.875^2}} = \frac{0.125}{\sqrt[2]{41.625 - 15.015625}} = \frac{0.125}{\sqrt[2]{26.609375}} = \frac{0.125}{5.1584275704908371} = 0.0242321905836328$$

Operations in this step: 1 square root, 2 divisions, 1 multiplication, 2 subtractions There are a total of 1 square root, 3 divisions, 3 multiplications, 2 additions and 4 subtractions when iteratively calculating the Z-score of $x_8$ in computation subset 505.

Fig. 5D Cont'd 2

|  | Square Root | Division | Multiplication | Addition | Subtraction |
|---|---|---|---|---|---|
| Traditional Algorithm | 1 | 3 | 8 | 14 | 9 |
| Iterative Algorithm 1 | 1 | 3 | 1 | 4 | 4 |
| Iterative Algorithm 2 | 1 | 3 | 1 | 4 | 4 |
| Iterative Algorithm 3 | 1 | 3 | 3 | 2 | 4 |

|  | Square Root | Division | Multiplication | Addition | Subtraction |
|---|---|---|---|---|---|
| Traditional Algorithm | 1 | 3 | 1,000,000 | 1,999,998 | 1,000,001 |
| Iterative Algorithm 1 | 1 | 3 | 1 | 4 | 4 |
| Iterative Algorithm 2 | 1 | 3 | 1 | 4 | 4 |
| Iterative Algorithm 3 | 1 | 3 | 3 | 2 | 4 |

ITERATIVE Z-SCORE CALCULATION FOR BIG DATA USING COMPONENTS

CROSS-REFERENCE TO RELATED APPLICATIONS

This application claims the benefit of provisional patent application Ser. No. 62/115,152, filed 2015 Feb. 12 by the present inventor.

BACKGROUND AND RELEVANT ART

Internet, mobile communications, navigation, online gaming, sensing technologies and large scale computing infrastructures are producing large amounts of data every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Processing Big Data can include performing calculations on multiple data elements. When performing statistical calculations on Big Data elements, the number of data elements to be accessed could be quite large. For example, when calculating a Z-score a (potentially large) number of data elements may need to be accessed.

The difference between processing live data stream and streamed Big Data is that when processing streamed Big Data, all historical data elements are accessible, and thus it may not need to create a buffer to store received data elements.

Further, some statistical calculations are recalculated after some data changes in a Big Data set. Thus, the (potentially large) number of data elements may be repeatedly accessed. For example, it may be that a Z-score is calculated for a computation subset with a fixed size that includes n data elements of a Big Data set stored in storage media. As such, every time two data elements are accessed or received, one of the accessed or received elements is added to the computation subset and the other data element is removed from the computation subset. The n data elements in the computation subset are then accessed to recalculate the Z-score.

As such, each data change in the computation subset may only change a small portion of the computation subset. Using all data elements in the computation subset to recalculate the Z-score involves redundant data access and computation, and thus is time consuming and is an inefficient use of resources.

Depending on necessity, the computation subset size n could be extremely large, so the data elements in a computation subset may be distributed over a cloud comprising hundreds of thousands of computing devices. Re-performing Z-score calculations in traditional ways on a Big Data set after some data changes results in slow response and significant waste of computing resources.

BRIEF SUMMARY

The present disclosure describes methods, systems, and computing system program products for iteratively calculating Z-score for Big Data. A computing system comprises one or more computing devices. Each of the computing devices comprises one or more processors. The computing system comprises one or more storage media. The computing system has stored a data set on the one or more storage media. A computation subset size indicates a specified number n (n>1) of data elements in a computation subset of the data set. Embodiments of the invention include iteratively calculating one or more components of a Z-score for a modified computation subset based on one or more components calculated for the previous computation subset and then calculating the Z-score for the modified computation subset based on one or more of the iteratively calculated components. Iteratively calculating the Z-score avoids visiting all data elements in the computation subset and performing redundant computations thereby increasing calculation efficiency, saving computing resources and reducing computing devices' system's power consumption.

As used herein, a component of a Z-score is a quantity or expression appearing in the Z-score's definition equation or any transforms of the definition equation. A Z-score may be calculated based on its one or more components.

The computing system initializes one or more (v ($1 \leq v \leq p$)) components of a Z-score for a computation subset of a specified size n (n>1). The initialization of the one or more components comprises calculating the one or more components through their definitions based on the data elements in the computation subset or accessing or receiving pre-calculated one or more components from one or more computing-device-readable media.

The computing system accesses a data element to be removed from the computation subset and a data element to be added to the computation subset. The computing system modifies the computation subset by removing the to-be-removed data element from the computation subset and adding the to-be-added data element to the computation subset.

The computing system directly iteratively calculates v ($1 \leq v \leq p$) components for the modified computation subset. Directly iteratively calculating the v components of a Z-score includes directly iteratively calculating each of the v components one by one. Directly iteratively calculating a component includes: accessing the component calculated for the previous computation subset; removing any contribution of the removed data element from the component mathematically; and adding a contribution of the added data element to the component mathematically.

The computing system indirectly iteratively calculates w=p−v components as needed: indirectly iteratively calculating the w components includes indirectly iteratively calculating each of the w components one by one. Indirectly iteratively calculating a component includes calculating the component based on one or more components other than the component itself. The one or more components may have been initialized, directly iteratively calculated or indirectly iteratively calculated.

The computing system calculates a Z-score as needed based on one or more iteratively calculated components of the Z-score.

The computing system may keep accessing an existing data element to be removed from the computation subset and a data element to be added to the computation subset, modifying the computation subset, directly iteratively calculating v ($1 \leq v \leq p$) components, indirectly iteratively calculating w=p−v components and calculating a Z-score based on the one or more iteratively calculated components as needed, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates traditional equations for calculating a Z-score in a computation subset.

FIG. 4B illustrates some components of a Z-score, which may be used for iteratively calculating the Z-score in a computation subset.

FIG. 4C illustrates the first example iterative Z-score calculation algorithm (iterative algorithm 1) and its equations for iteratively calculating a Z-score based on the iteratively calculated sum $S_{k+1}$ or mean $\bar{x}_{k+1}$ as shown in FIG. 4B.

FIG. 4D illustrates the second example iterative Z-score algorithm (iterative algorithm 2) and its equations for iteratively calculating a Z-score in a computation subset based on mean $\bar{x}_{k+1}$ as shown in FIG. 4B and iteratively calculated $$\sum_{1}^{n}(x_i - \bar{x}_{k+1})^2 + (x_a - \bar{x}_{k+1})^2 - (x_r - \bar{x}_{k+1})^2.$$

FIG. 4E illustrates the third example iterative Z-score algorithm (iterative algorithm 3) and its equations for iteratively calculating a Z-score in a computation subset based on mean $\bar{x}_{k+1}$ as shown in FIG. 4B and iteratively calculated $$\sum_{1}^{n} x_i^2 + x_a^2 - x_r^2.$$

FIG. 5A illustrates an example of calculating Z-score using traditional algorithms as shown in FIG. 4A.

FIG. 5B illustrates an example of calculating Z-score using the iterative algorithm 1 as shown in FIG. 4C.

FIG. 5C illustrates an example of calculating Z-score using the iterative algorithm 2 as shown in FIG. 4D.

FIG. 5D illustrates an example of calculating Z-score using the iterative algorithm 3 as shown in FIG. 4E.

FIG. 6 illustrates computational loads for traditional Z-score algorithms and iterative Z-score algorithms with a computation subset of size 8.

FIG. 7 illustrates computational loads for traditional Z-score algorithms and iterative Z-score algorithms with a computation subset of size 1,000,000.

DETAILED DESCRIPTION

Figure 1:
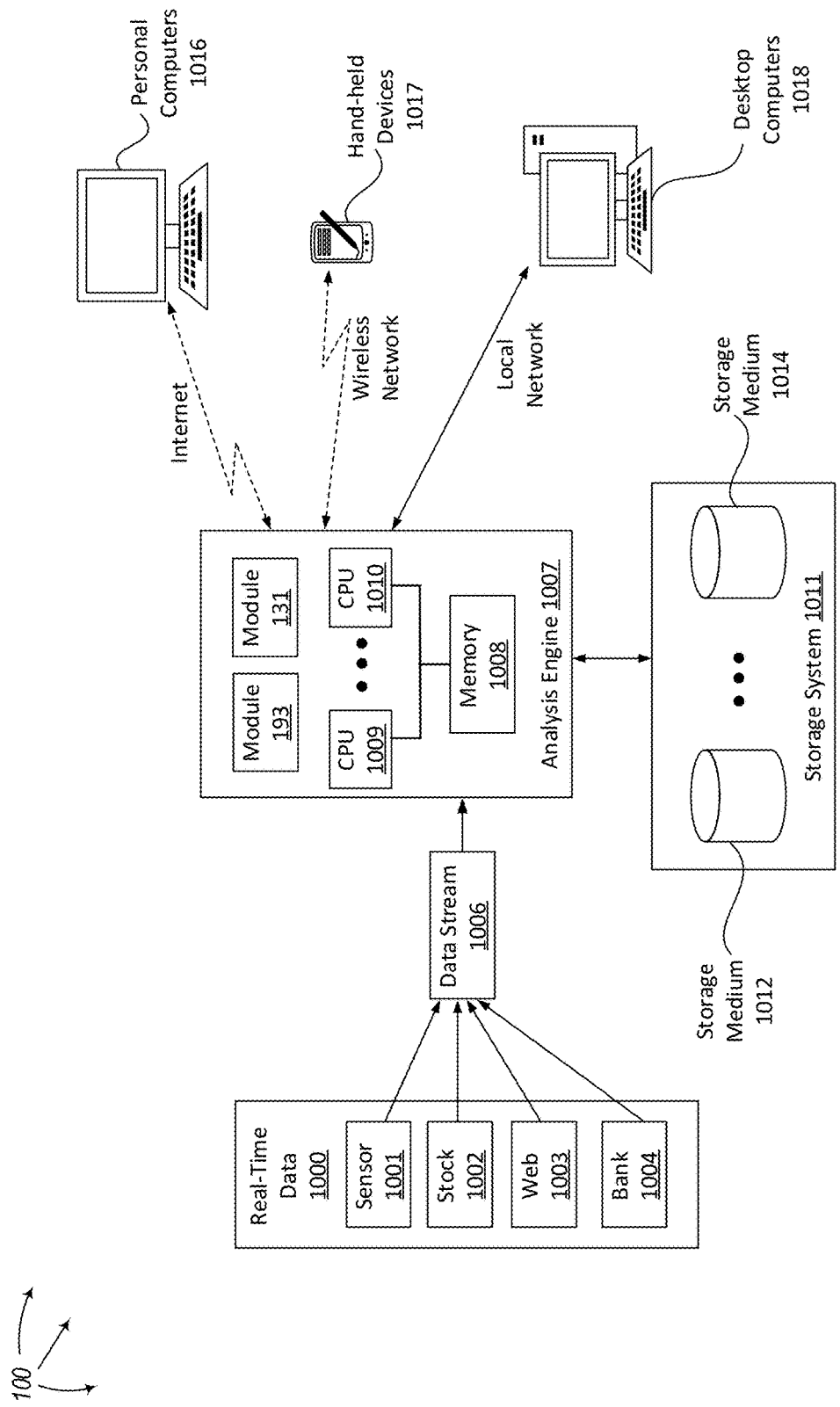
FIG. 1 illustrates a high-level overview of an example computing system that facilitates iteratively calculating Z-score for Big Data.

The present disclosure describes methods, systems, and computing system program products for iteratively calculating Z-score for Big Data. A system comprising one or more computing devices includes one or more storage media that have stored a Big Data set. A computation subset size indicates a specified number n (n>1) of data elements in a computation subset. The computation subset, a subset of the Big Data set, contains the data elements involved in a Z-score calculation. Iteratively calculating a Z-score for a modified computation subset includes iteratively calculating one or more (p (p≥1)) components of a Z-score for the modified computation subset based on one or more components of a Z-score for a previous computation subset and then calculating the Z-score as needed using one or more iteratively calculated components. Iteratively calculating the Z-score avoids visiting all data elements in the computation subset and performing redundant computations thereby increasing calculation efficiency, saving computing resources and reducing computing devices' system's power consumption.

A Z-score represents the number of standard deviation an observation or datum of a random variable is above or below the mean. A positive Z-score indicates a datum above the mean, while a negative Z-score indicate a datum below the mean.

As used herein, a computation subset is a subset of a Big Data set which comprises the data elements involved in a Z-score calculation. A computation subset is equivalent to a moving computation window when performing a Z-score calculation on streamed data or time series data. Within the description of embodiments of the present invention, the difference between a computation window and a computation subset is that data elements in a computation window are ordered but that in a computation subset are not.

As used herein, a component of a Z-score is a quantity or expression appearing in the Z-score's definition equation or any transforms of the definition equation. For example, a mean is a component of a Z-score, and a population variance is also a component of a Z-score. A Z-score comprises one or more components. A Z-score itself may be considered as the largest component of a Z-score. A Z-score may be calculated using its components. Some example components of a Z-score may be found in FIG. 4B.

A component may be either directly iteratively calculated or indirectly iteratively calculated. The difference is that directly iteratively calculating a component uses the component's value in previous iterations; indirectly iteratively calculating a component uses components other than the component itself.

For a given component, it might be directly iteratively calculated in one algorithm but indirectly iteratively calculated in another algorithm.

For a given algorithm, assume the total number of different components is p (p≥1), the number of directly iteratively calculated components is v (1≤v≤p), then the number of indirectly iteratively calculated components is w=p−v (0≤w<p). For any algorithm, there will be at least one component being directly iteratively calculated. It is possible that all components are directly iteratively calculated (in this case v=p and w=0). However, directly iteratively calculated components must be calculated in every iteration no matter if a Z-score is accessed or not in a specific iteration.

For a given algorithm, if a component is directly iteratively calculated, then the component must be calculated in every iteration (i.e., whenever an existing data element is removed from and a data element is added to the computation subset). However, if a component is indirectly iteratively calculated, then the component only needs to be calculated as needed, i.e., when a Z-score needs to be calculated and accessed. Thus, when a Z-score is not accessed in a specific iteration and some components are indirectly iteratively calculated, only a small number of components need to be iteratively calculated. Understanding that an indirectly iteratively calculated component may also be used in the calculation of a directly iteratively calculated component. In that case, the indirectly iteratively calculated component should also be calculated in every iteration.

Embodiments of the invention include iteratively calculating one or more (p (p≥1)) components of a Z-score in a modified computation subset based on one or more (p (p≥1)) components calculated for a previous computation subset.

The computing system initializes one or more (v (1≤v≤p)) components of a Z-score for a computation subset of a specified size n (n>1). The initialization of the one or more components comprises calculating the one or more components through their definitions based on the data elements in the computation subset or accessing or receiving pre-calculated one or more components from one or more computing-device-readable media.

The computing system accesses a data element to be removed from the computation subset and a data element to be added to the computation subset. The computing system modifies the computation subset by: removing the to-be-removed data element from the computation subset and adding the to-be-added data element to the computation subset.

The computing system directly iteratively calculates v (1≤v≤p) components for the modified computation subset. Directly iteratively calculating the v components of a Z-score includes directly iteratively calculating each of the v components one by one. Directly iteratively calculating a component includes: accessing the component calculated for the previous computation subset; removing any contribution of the removed data element from the component mathematically; adding any contribution of the added data element to the component mathematically.

The computing system indirectly iteratively calculates w=p−v components as needed: indirectly iteratively calculating the w components includes indirectly iteratively calculating each of the w components one by one. Indirectly iteratively calculating a component includes calculating the component using one or more components other than the component itself (Depending on the specific algorithm used, calculating each of the w components may also need access to and use of the data element added to the computation subset). The one or more components may have been initialized, directly iteratively calculated or indirectly iteratively calculated.

The computing system calculates a Z-score as needed based on one or more initialized or iteratively calculated components of the Z-score.

The computing system may keep accessing an existing data element to be removed from the computation subset and a data element from the data set to be added to the computation subset, modifying the computation subset, directly iteratively calculating v (1≤v≤p) components, indirectly iteratively calculating w=p−v components as needed and calculating a Z-score as needed using one or more components, and the computing system may repeat this process for as many times as needed.

Embodiments of the present invention may comprise or utilize a special purpose or general-purpose computing device including computing device hardware, such as, for example, one or more processors and storage devices, as discussed in greater detail below. Embodiments within the scope of the present invention also include physical and other computing device-readable media for carrying or storing computing device-executable instructions and/or data structures. Such computing device-readable media may be any available media that may be accessed by a general purpose or special purpose computing device. Computing device-readable media that store computing device-executable instructions are computing device storage media (devices). Computing device-readable media that carry computing device-executable instructions are transmission media. Thus, by way of example, and not limitation, embodiments of the invention can comprise at least two distinctly different kinds of computing device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media can include a network and/or data links which may be used to carry desired program code means in the form of computing device-executable instructions or data structures and which may be accessed by a general purpose or special purpose computing device. Combinations of the above should also be included within the scope of computing device-readable media.

Further, upon reaching various computing device components, program code means in the form of computing device-executable instructions or data structures may be transferred automatically from transmission media to computing device storage media (devices) (or vice versa). For example, computing device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing device-executable instructions comprise, for example, instructions and data which, when executed at a processor, cause a general purpose computing device, special purpose computing device, or special purpose processing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, minicomputers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Several examples will be given in the following sections.

FIG. 1 illustrates a high-level overview of an example computing system 100 that facilitates iteratively calculating Z-score for Big Data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, Z-score calculation modules 193 and component calculation modules 131. Z-score calculation modules 193 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Understanding that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
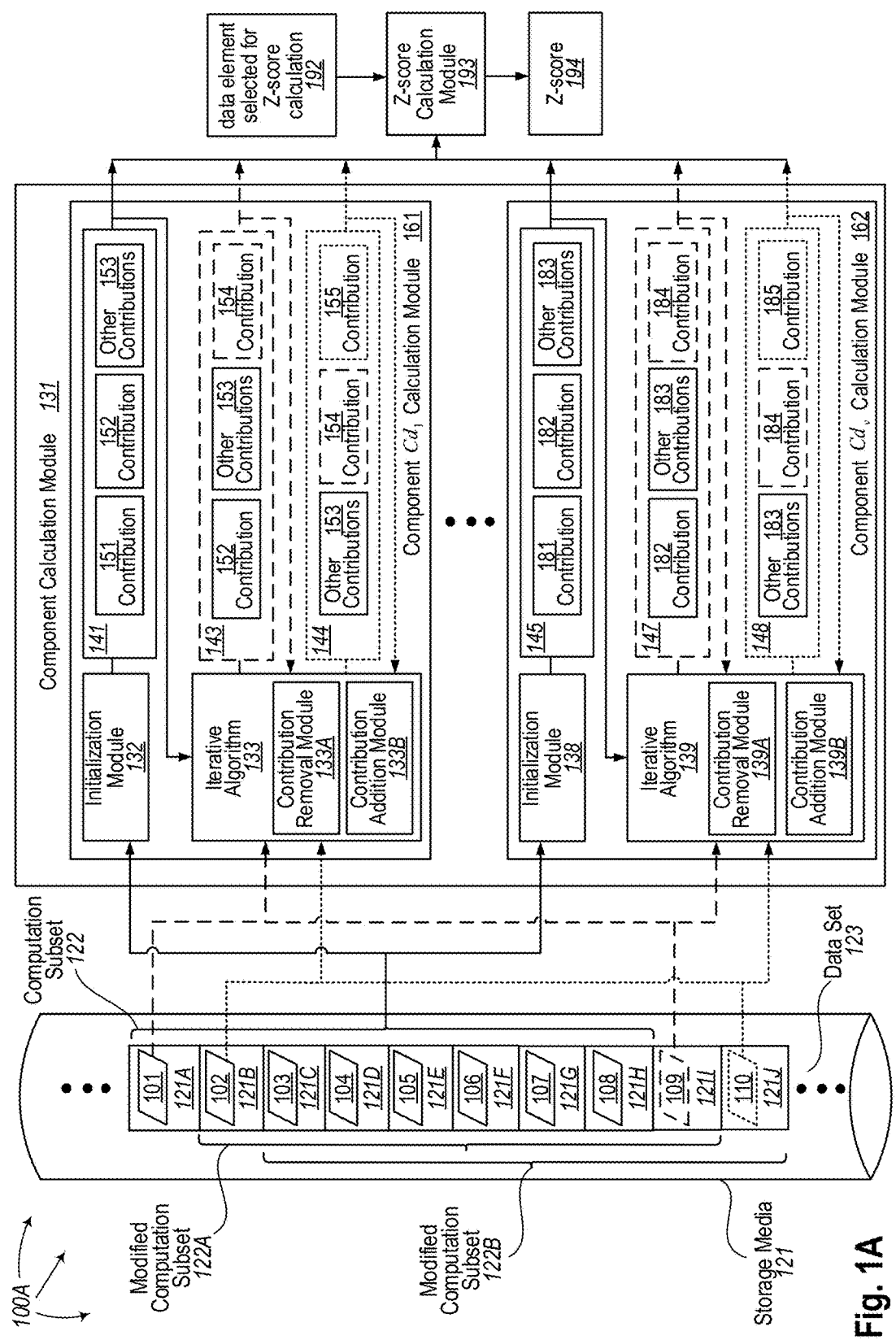
FIG. 1A illustrates an example computing system architecture that facilitates iteratively calculating Z-score for Big Data with all components being directly iteratively calculated.

FIG. 1A illustrates an example computing system architecture 100A that facilitates iteratively calculating Z-score for Big Data with all components (p (p=v≥1)) being directly iteratively calculated, in other words v=p≥1 and w=0. FIG. 1A illustrates 1007 and 1006 shown in FIG. 1. Referring to FIG. 1A, computing system architecture 100A includes component calculation module 131 and Z-score calculation module 193. Component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. Accordingly, iterative component calculation module 131 as well as any other connected computing devices and their components, may send and receive message related data (e.g., Internet Protocol ("IP") datagrams and/or other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of Z-score calculation module 193, and Z-score calculation module 193 will take the output of component calculation module 131 and a data element selected for Z-score calculation 192 as input to generate Z-score 194.

In general, storage media 121 may be a single local storage medium and may also be a complex storage system that comprises multiple physically distributed storage devices managed by a storage management system.

Storage media 121 comprises a data set 123. Data set 123 may comprise different kinds of data, such as, for example, stock quotes, audio data, video data, geospatial data, web data, mobile communication data, online gaming data, banking transaction data, sensor data, and closed-captioning data, real time text, etc.

As depicted, data set 123 comprises multiple data elements stored in multiple locations. For example, data elements 101 is stored in location 121A, data element 102 is stored in location 121B, data element 103 is stored in location 121C, data element 104 is stored in location 121D, data element 105 is stored in location 121E, data element 106 is stored in location 121F, data element 107 is stored in location 121G, data element 108 is stored in location 121H, data element 109 is stored in location 121I, and data element 110 is stored in location 121I, etc., . . . . There are multiple data elements stored in other locations.

Assume that a Z-score calculation is started from computation subset 122. Computation subset 122 with a specified size of 8 (i.e., n=8) contains a portion of data set 123: data elements 101, 102, and 108. All the data elements ranging from 101 to 108 in computation subset 122 may be accessed for initializing one or more components of the Z-score.

Next, data elements 101 and 109 may be accessed from locations 121A and 121I respectively. Data element 101 will be removed from computation subset 122, and data element 109 will be added to computation subset 122, then computation subset 122 becomes modified computation subset 122A. Modified computation subset 122A contains 8 data elements: 102, 103, . . . , 109. The computing system may iteratively calculate a Z-score for modified computation subset 122A.

Subsequently, data elements 102 and 110 may be accessed from locations 121B and 121J respectively. Data element 102 will be removed from modified computation subset 122A, and data element 110 will be added to modified computation subset 122A, then modified computation subset 122A becomes modified computation subset 122B. Modified computation subset 122B contains 8 data elements: 103, 103, . . . , 110. The computing system may iteratively calculate a Z-score for modified computation subset 122B.

More details about the example computing system architecture are provided below.

In general, component calculation module 131 comprises one or more (v (v=p≥1)) component calculation modules for calculating (v (v=p≥1)) components of a Z-score for a set of n data elements in a computation subset. The number v varies depending on which iterative algorithm is used. As depicted in FIG. 1A, component calculation module 131 comprises component $Cd_1$ calculation module 161 and component $Cd_v$ calculation module 162, and there are v−2 other component calculation modules between them. Component $Cd_1$ calculation module 161 comprises initialization module 132 for initializing component $Cd_1$ and iterative algorithm 133 for iteratively calculating component $Cd_1$. Component $Cd_v$ calculation module 162 comprises initialization module 138 for initializing component $Cd_v$ and iterative algorithm 139 for iteratively calculating component $Cd_v$. Initialization module 132 is configured to calculate component $Cd_1$ for a set of n data elements in a computation subset and initialization module 138 is configured to calculate component $Cd_v$ for a set of n data elements in a computation subset. Component $Cd_1$ 141 and component $Cd_v$ 145 receive a full set of n data elements (e.g., n=8) from a computation subset as input. Initialization module 132 calculates component $Cd_1$ and initialization module 138 calculates component $Cd_v$ from the full set of n data elements. Thus, each data element contributes to the calculated components ranging from component $Cd_1$ to component $Cd_v$. Initialization module 132 may be used for an initial component $Cd_1$ calculation or when component $Cd_1$ calculations are reset. Similarly, initialization module 138 may be used for an initial component $Cd_v$ calculation or when component $Cd_v$ calculations are reset.

Iterative component algorithms are also configured to calculate components for a set of data elements in a computation subset. Iterative algorithm 133 accesses or receives a prior component $Cd_1$ value, the removed data element and the added data element as input. Iterative algorithm 133 calculates a new component $Cd_1$ from the prior component $Cd_1$ value, the removed data element and the added data element. Contribution removal module 133A can remove a contribution of the removed data element from the prior component $Cd_1$. Contribution addition module 133B can add a contribution of the added data element to the prior component $Cd_1$. Removing a contribution of the removed data element along with adding a contribution of the added data element may be used for directly iteratively calculating component $Cd_1$ for the computation subset. Iterative algorithm 139 works in a similar way as iterative algorithm 133. Iterative algorithm 139 accesses or receives a prior component $Cd_v$ value, the removed data element and the added data element as input. Iterative algorithm 139 calculates a new component $Cd_v$ from the prior component $Cd_v$ value, the removed data element and the added data element. Contribution removal module 139A can remove any contribution of the removed data element from the prior component $Cd_v$. Contribution addition module 139B can add any contribution of the added data element to the prior component $Cd_v$. Removing a contribution of the removed data element along with adding a contribution of the added data element may be used for calculating component $Cd_v$ for the computation subset.

Referring to FIG. 1A, computing system architecture 100A also includes Z-score calculation module 193. Once p (p=v≥1) components of a Z-score are calculated by component calculation module 131, Z-score calculation module 193 may take a data element selected for Z-score calculation 192 as input. When a data element is selected for a Z-score calculation, Z-score calculation module 193 may access the data element selected for a Z-score calculation and calculate the Z-score 194 as needed based on one or more iteratively calculated components.

Figure 1B:
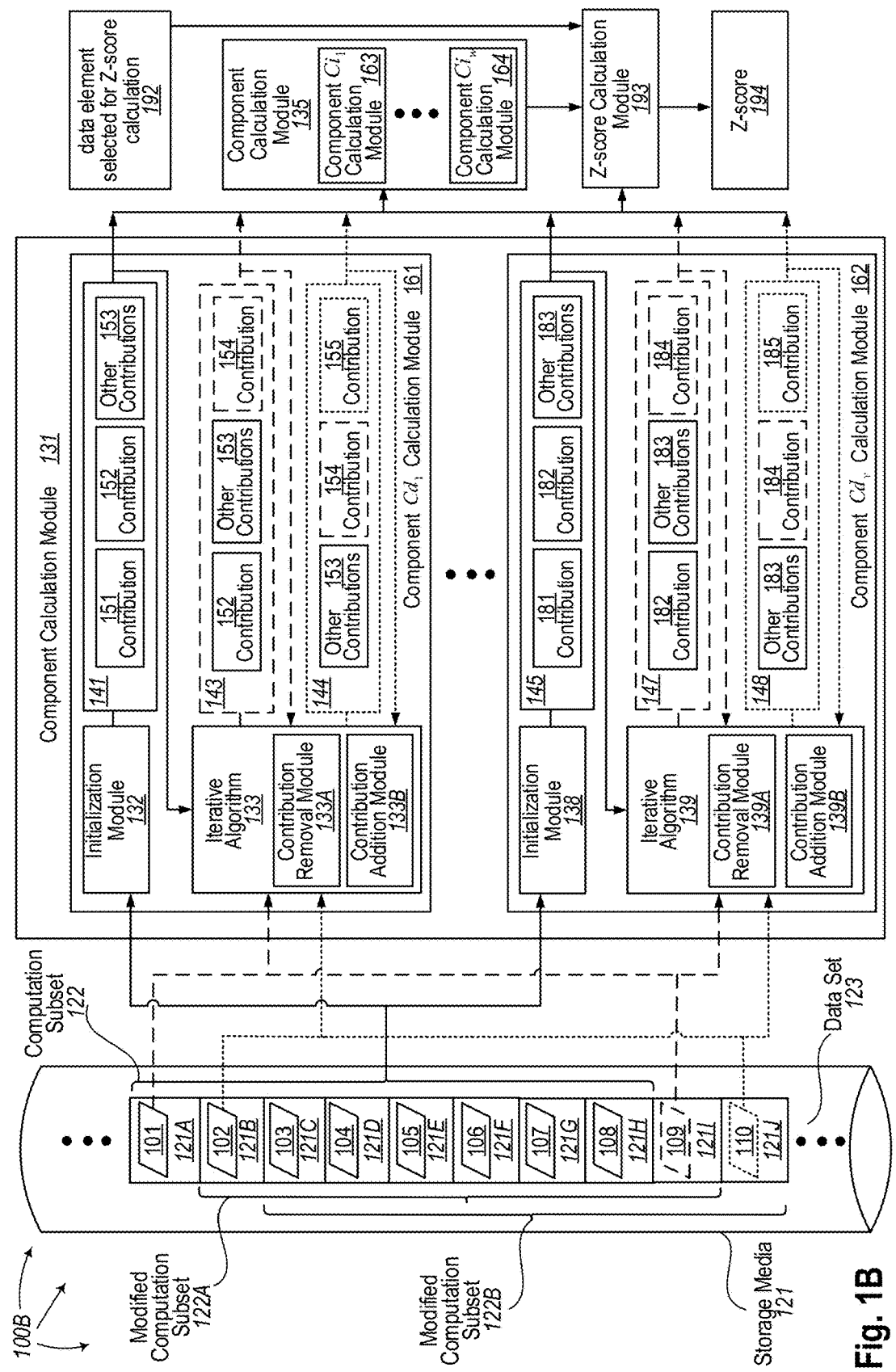
FIG. 1B illustrates an example computing system architecture that facilitates iteratively calculating Z-score for Big Data with some components being directly iteratively calculated and some components being indirectly iteratively calculated.

FIG. 1B illustrates an example computing system architecture 100B that facilitates iteratively calculating Z-score for Big Data with some (v (1≤v<p)) components being directly iteratively calculated and some (w=p−v (1≤w<p)) components being indirectly iteratively calculated. Both the number v and the number w are algorithm dependent. Many parts included in computing system architectures 100B and 100A have same reference numbers. Those parts have similar structures and work in similar ways. In certain implementations, the difference between computing system architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Computing system architecture 100B also includes component calculation module 131, which also includes v component calculation modules for directly iteratively calculating v components, however the number v in 100B may not be the same number v as in 100A, because some directly iteratively calculated components in 100A are indirectly iteratively calculated in 100B. In 100A, v=p≥1, but in 100B, 1≤v<p. Referring to FIG. 1B, computing system architecture 100B includes component calculation module 135. The output of components calculation module 131 may be used as the input of component calculation module 135. A data element selected for Z-score calculation 192 and the output of calculation modules 131 and 135 may be used as the input of Z-score calculation module 193, and Z-score calculation module 193 may generate Z-score 194. Component calculation module 135 generally includes w=p−v component calculation modules for indirectly iteratively calculating w components. For example, component calculation module 135 includes calculation module 163 for indirectly iteratively calculating component $Ci_1$ and calculation module 164 for indirectly iteratively calculating component $Ci_w$, and there are w−2 component calculation modules in between. Indirectly iteratively calculating w components includes indirectly iteratively calculating each of the w components one by one. Indirectly iteratively calculating a component includes accessing and using one or more components other than the component itself. The one or more components may have been initialized, directly iteratively calculated or indirectly iteratively calculated. To save computation time, indirectly iteratively calculated components ranging from $Ci_1$ to $Ci_w$ may be calculated as needed, i.e., components ranging from $Ci_1$ to $Ci_w$ might not be calculated in every iteration. In other words, components ranging from $Ci_1$ to $Ci_w$ only need to be calculated when a Z-score is accessed. However, directly iteratively calculated components ranging from $Cd_1$ to $Cd_v$ must be calculated in every iteration even if a Z-score is not accessed in every iteration.

Referring to computing system architecture 100B, once all p (p=v+w) components have been calculated, Z-score calculation module 193 may take a data element selected for Z-score calculation 192 as input. When a data element is selected for a Z-score calculation, Z-score calculation module 193 may access the data element selected for a Z-score calculation and calculating a Z-score 194 as needed based on one or more initialized or iteratively calculated components.

Figure 2:
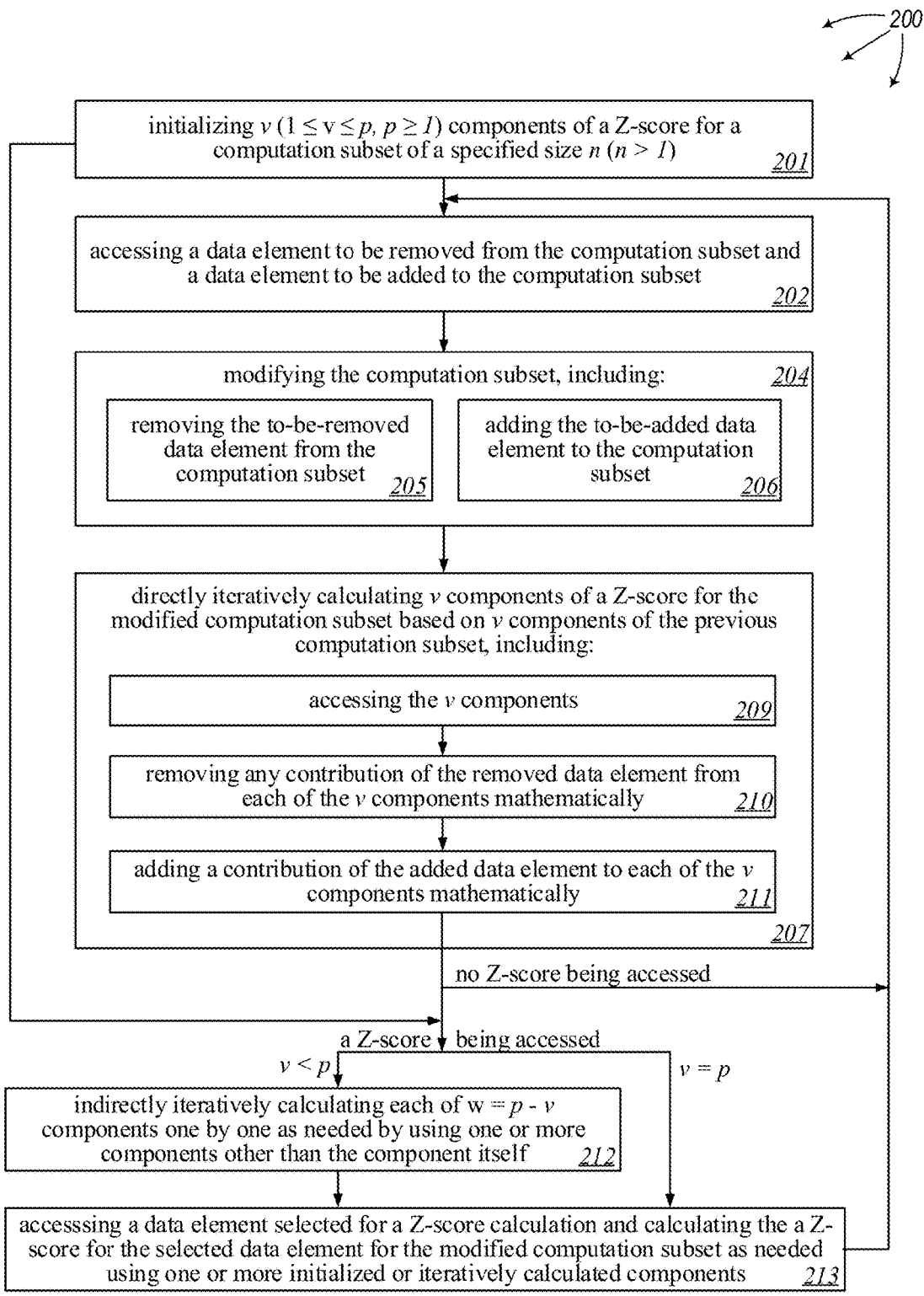
FIG. 2 illustrates a flow chart of an example method for iteratively calculating Z-score for Big Data.

FIG. 2 illustrates a flow chart of an example method 200 for iteratively calculating a Z-score for Big Data. Method 200 will be described with respect to the components and data of computing system architectures 100A and 100B.

Method 200 includes initializing v (1≤v≤p, p≥1) components of a Z-score for a computation subset of a specified size n (n>1) (201). For example, in computing system architecture 100A and computing system architecture 100B, computation subset size is specified as 8, and initialization module 132 may be used for initializing component $Cd_1$ 141 for computation subset 122 of size 8 which contains data elements 101, 102, 103, 104, 105, 106, 107 and 108. As depicted, component $Cd_1$ 141 includes contribution 151, contribution 152, and other contributions 153. Contribution 151 is a contribution of data element 101. Contribution 152 is a contribution of data element 102. Other contributions 153 are contributions of data elements 103, 104, 105, 106, 107 and 108. Similarly, initialization module 138 may be used for initializing component $Cd_v$ 145 for computation subset 122 of size 8 which contains data elements 101, 102, 103, 104, 105, 106, 107 and 108. As depicted, component $Cd_v$ 145 includes contribution 181, contribution 182, and other contributions 183. Contribution 181 is a contribution of data element 101. Contribution 182 is a contribution of data element 102. Other contributions 183 are contributions of data elements 103, 104, 105, 106, 107 and 108.

Method 200 includes accessing a data element to be removed from the computation subset and a data element to be added to the computation subset (202). For example, data element 101 and data element 109 may be accessed subsequent to accessing data elements 102-108, and data element 101 may be removed from and data element 109 may be added to modified computation subset 122A.

Method 200 includes modifying the computation subset (204). For example, computation subset 122 may be modified to computation subset 122A. Modifying the computation subset includes removing the to-be-removed data element from the computation subset (205) and adding the to-be-added data element to the computation subset (206). For example, data element 101 is removed from computation subset 122 and data element 109 is added to computation subset 122 which then becomes modified computation subset 122A.

Method 200 includes directly iteratively calculating v (1≤v≤p) components of a Z-score for the modified computation subset based on v components of the previous computation subset (207). For example, iterative algorithm 133 may be used for directly iteratively calculating component $Cd_1$ 143 (for modified computation subset 122A) based on component $Cd_1$ 141 (for computation subset 122), and iterative algorithm 139 may be used for directly iteratively calculating component $Cd_v$ 147 (for modified computation subset 122A) based on component $Cd_1$ 145 (for computation subset 122).

Directly iteratively calculating v components of a Z-score for the modified computation subset includes accessing the v components of a Z-score in the previous computation subset (209). For example, iterative algorithm 133 may access component $Cd_1$ 141. Similarly, iterative algorithm 139 may access component $Cd_v$ 145.

Directly iteratively calculating v components of a Z-score for the modified computation subset includes removing any contribution of the removed data element from each of the v components mathematically (210). For example, iteratively calculating component $Cd_1$ 143 may include contribution removal module 133A removing contribution 151 (i.e., the contribution of data element 101) from component $Cd_1$ 141 mathematically, and iteratively calculating component $Cd_v$ 147 may include contribution removal module 139A removing contribution 181 (i.e., the contribution of data element 101) from component $Cd_v$ 145 mathematically. Directly iteratively calculating v components of a Z-score for the modified computation subset includes adding a contribution of the added data element to each of the v components mathematically (211). For example, iteratively calculating component $Cd_1$ 143 may include contribution addition module 133B adding contribution 154 to component $Cd_1$ 141 mathematically, and iteratively calculating component $Cd_v$ 147 may include contribution addition module 139B adding contribution 184 to component $Cd_v$ 145 mathematically. Contribution 154 and 184 are contributions of data element 109.

As depicted, component $Cd_1$ 143 includes contribution 152 (a contribution of data element 102), other contributions 153 (contributions of data elements 103-108), and contribution 154 (a contribution of data element 109). Similarly, component $Cd_v$ 147 includes contribution 182 (a contribution of data element 102), other contributions 183 (contributions of data elements 103-108), and contribution 184 (a contribution of data element 109).

Besides directly iteratively calculated components, some components may be indirectly iteratively calculated. When not all components are directly iteratively calculated (v<p), method 200 includes indirectly iteratively calculating w=p-v components one by one as needed based on one or more components other than the component itself (212). An indirectly iteratively calculated component may be calculated as needed by one or more components other than the component itself. Since the w indirectly iteratively calculated components are calculated using other components, they might not need to be initialized. In addition, the w indirectly iteratively calculated components might not need to be calculated in every iteration (i.e., an existing data element is removed from and a data element is added to the computation subset). The w indirectly iteratively calculated components only need to be calculated when a Z-score is accessed to save computation time. For example, referring to FIG. 1B where some components are directly iteratively calculated and some are indirectly iteratively calculated, calculation module 163 may indirectly iteratively calculate $Ci_1$ based on one or more components other than $Ci_1$, and calculation module 164 may indirectly iteratively calculate $Ci_w$ based on one or more components other than $Ci_w$. The one or more components may have been initialized, directly iteratively calculated, or indirectly iteratively calculated. The w components ranging from $Ci_1$ to $Ci_w$ only need to be calculated when a Z-score is accessed. For a given component, it is possible that it is directly iteratively calculated in one algorithm but indirectly iteratively calculated in another algorithm.

Z-score calculation module 193 may then access a data element selected for Z-score calculation 192 and calculate Z-score 194 for the selected data element for the modified computation subset as needed based on the one or more initialized or iteratively calculated components, for example, component $Cd_1$ 143 and component $Cd_v$ 147 (213).

202-211 may be repeated as additional data elements are accessed. 212-213 may be repeated as needed. For example, subsequent to calculating components ranging from $Cd_1$ 143 to $Cd_v$ 147, data element 102 and data element 110 may be accessed (202). Data elements 102 and 110 may be accessed from location 121B and 121J respectively. Modified computation subset 122A may become modified computation subset 122B (204) by removing data element 102 (205) and adding data element 110 (206).

Iterative algorithm 133 may be used for directly iteratively calculating component $Cd_1$ 144 (for modified computation subset 122B) based on component $Cd_1$ 143 (for modified computation subset 122A) (207). Iterative algorithm 133 may access component $Cd_1$ 143 (209). Iteratively calculating component $Cd_1$ 144 may include contribution removal module 133A removing contribution 152 (i.e., the contribution of data element 102) from component $Cd_1$ 143 mathematically (210). Iteratively calculating component $Cd_1$ 144 may include contribution addition module 133B adding contribution 155 to component $Cd_1$ 143 mathematically (211). Contribution 155 is a contribution of data element 110.

Similarly, iterative component $Cd_v$ algorithm 139 may be used for directly iteratively calculating component $Cd_v$ 148 (for modified computation subset 122B) based on component $Cd_v$ 147 (for modified computation subset 122A) (207). Iterative component $Cd_v$ algorithm 139 may access component $Cd_v$ 147 (209). Iteratively calculating component $Cd_v$ 148 may include contribution removal module 139A removing contribution 182 (i.e., the contribution of data element 102) from component $Cd_v$ 147 mathematically (210). Iteratively calculating component $Cd_v$ 148 may include contribution addition module 139B adding contribution 185 to component $Cd_v$ 147 mathematically (211). Contribution 185 is a contribution of data element 110.

As depicted, component $Cd_1$ 144 includes other contributions 153 (contributions of data elements 103-108), contribution 154 (a contribution of data element 109), and contribution 155 (a contribution of data element 110), while component $Cd_v$ 148 includes other contributions 183 (contributions of data elements 103-108), contribution 184 (a contribution of data element 109), and contribution 185 (a contribution of data element 110).

Some components may be directly iteratively calculated (209, 210 and 211) and some components may be indirectly iteratively calculated (212). For example, Referring to FIG. 1B, calculation module 163 may indirectly iteratively calculate $Ci_1$ based on component $Cd_1$ and two other directly iteratively calculated components, and calculation module 164 may indirectly iteratively calculate $Ci_w$ based on directly iteratively calculated component $Cd_v$, indirectly iteratively calculated component $Ci_1$ and the input data element.

Z-score calculation module 193 may then access a data element selected for Z-score calculation 192 and calculate Z-score 194 for the selected data element for the modified computation subset based on the one or more iteratively calculated components, for example, component $Cd_1$ 144 and component $Cd_v$ 148 (213).

When a next data element is accessed, component $Cd_1$ 144 may be used for directly iteratively calculating a component $Cd_1$ for the modified computation subset and component $Cd_v$ 148 may be used for directly iteratively calculating a component $Cd_v$ for the modified computation subset.

Figure 3B:
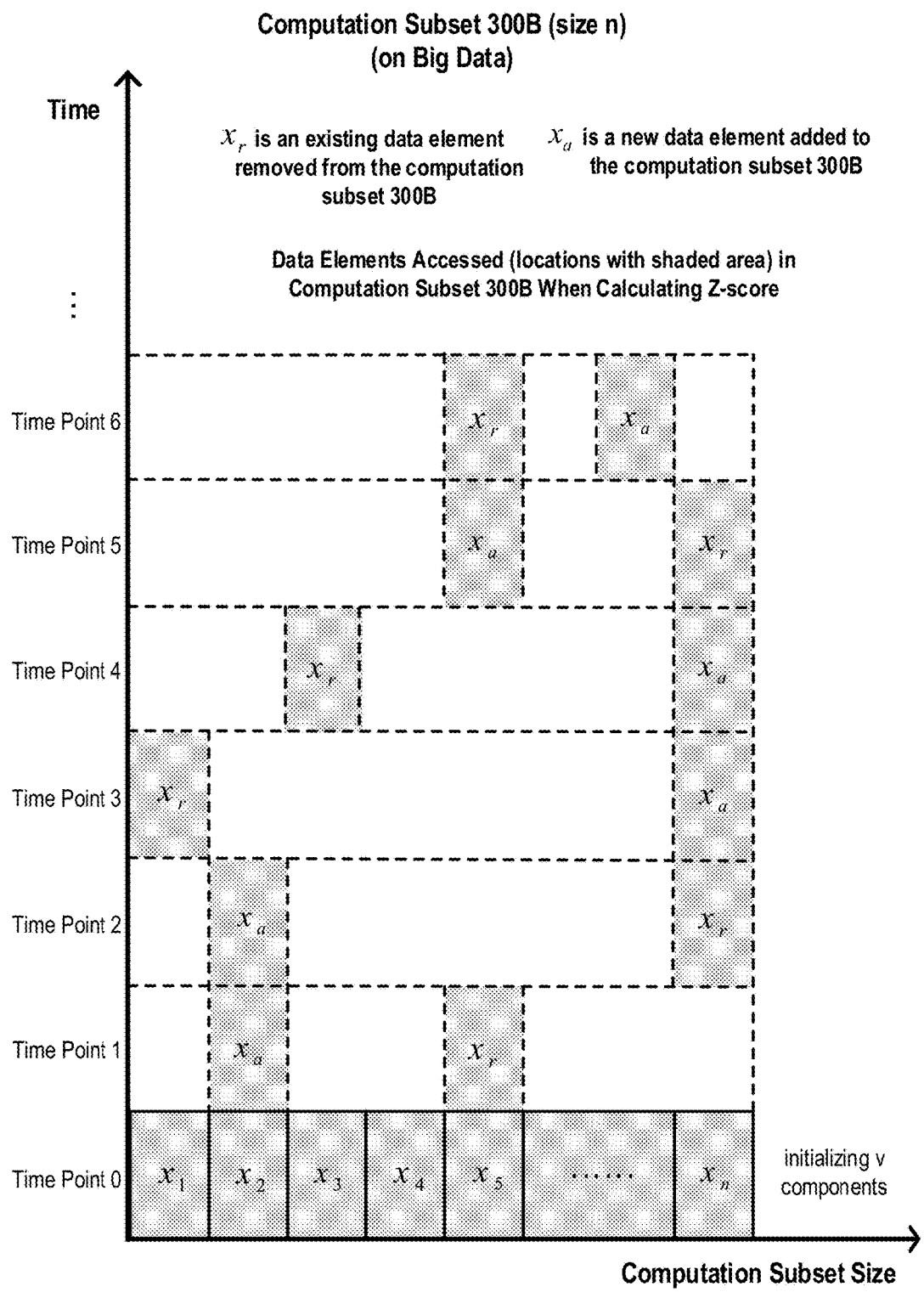
FIG. 3B illustrates the data elements that are accessed from a computation subset for iteratively calculating a Z-score on Big Data.

FIG. 3B illustrates data that is accessed from a computation subset 300B for iteratively calculating a Z-score on Big Data. Referring to FIG. 3B, an existing data element may be removed from any position (indicated by letter "r") of computation subset 300B and a newly accessed data element may be added to any position (indicated by letter "a") of computation subset 300B. For computation subset 300B, when initializing v components of a Z-score, the first n data elements might be accessed for calculating v components of a Z-score for the first computation subset. As time progresses, an existing data element removed from the computation subset 300B and a data element added to the computation subset 300B, are accessed for directly iteratively calculating v components for the modified computation subset, indirectly iteratively calculating w=p-v components, and calculating the Z-score based on one or more iteratively calculated components. The v components may be directly iteratively calculated from the removed data element, the added data element and the v components for the previous computation subset. For a given iterative algorithm, v is a constant, so the number of operations for directly iteratively calculating v components is a constant, and the number of operations for indirectly iteratively calculating w=p−v components is also a constant. Thus, after calculation of the p components for the first computation subset, computation workload is reduced and remains constant. The larger the n, the more substantial the reduction in computation workload.

FIG. 4A illustrates the definition of a Z-score and equations for calculating a Z-score. Suppose a computation subset X={$x_i$|i=1, ..., n} is a subset of a Big Data set which comprises the data elements to be involved in a Z-score calculation. Equation 401 is a traditional equation for calculating a sum of all the data elements in X. Equation 402 is a traditional equation for calculating a mean of all the data elements in X. Equation 403 is a traditional equation for calculating a Z-score for the computation subset X. Assuming the computation subset X of size n is changed with a data element $x_r$ (1≤r≤n) being removed and a data element $x_a$ being added. Define the modified computation subset as X'. Equation 404 is a traditional equation for calculating a sum of all the data elements in the modified computation subset X'. Equation 405 is a traditional equation for calculating a mean of all the data elements in the modified computation subset X'. Equation 406 is a traditional equation for calculating a Z-score for the modified computation subset X'.

FIG. 4B illustrates some example components of a Z-score and basic iterative component calculation equations. A component is a quantity or expression appearing in a Z-score's definition equation or any transforms of the equation. The following are a few examples of components of a Z-score.

$$s_k = \sum_1^n x_i$$

$$\bar{x}_k = \frac{1}{n}\sum_1^n x_i$$

$$SS_k = \sum_1^n x_i^2$$

$$SSD_k = \sum_1^n (x_i - \bar{x}_k)^2$$

$$vp_k = \frac{1}{n}\sum_1^n (x_i - \bar{x}_k)^2$$

$$\sigma_k = \sqrt{\frac{1}{n}\sum_1^n (x_i - \bar{x}_k)^2}$$

$$Z_k(x_m) = \frac{x_m - \bar{x}_k}{\sigma_k} = \frac{x_m - \bar{x}_k}{\sqrt[2]{\frac{1}{n}\sum_i^n (x_i - \bar{x}_k)^2}}$$

A Z-score may be calculated based on one or more components or combinations of them, so there are multiple algorithms supporting iterative Z-score calculation. To illustrate how to use components to iteratively calculate Z-score, three different iterative Z-score calculation algorithms are provided as examples. A new iteration of calculation is started each time any component of a Z-score is recalculated due to a data change in the computation subset (e g 122→122A→122B). A sum $$\sum_1^n x_i$$

or a mean $$\frac{1}{n}\sum_1^n x_i$$

is the basic component to be used for calculating a Z-score, so an equation for iteratively calculating a sum and a mean respectively is illustrated in FIG. 4B. Equation 407 is for iteratively calculating a sum of all the data elements in the modified computation subset X'. Equation 408 is for iteratively calculating a mean of all the data elements in the modified computation subset X'. Either a sum or a mean will be used in all three iterative Z-score calculation algorithms described later.

FIG. 4C illustrates the first example iterative Z-score calculation algorithm (iterative algorithm 1) for iteratively calculating a Z-score based on iteratively calculated population variance. Equation 401 may be used for initially calculating sum $S_k$ of data elements in the first computation subset of size n. Equation 402 may be used for initially calculating mean $\bar{x}_k$ of data elements in the first computation subset. Equation 409 may be used for initially calculating $vp_k$ in the first computation subset once $S_k$ or $\bar{x}_k$ is calculated. Equation 412 may be used for initially calculating Z-score of $x_m$ in the first computation subset once $vp_k$ is calculated. Equation 410 is a traditional way for calculating $vp_{k+1}$ in a modified computation subset. Equation 407 may be used for directly iteratively calculating component $S_{k+1}$ if component $S_k$ is available. Equation 408 may be used for directly iteratively calculating component $\bar{x}_{k+1}$ if component $\bar{x}_k$ is available. Equation 411 may be used for directly iteratively calculating population variance $vp_{k+1}$ on the computation subset X'based on components $vp_k$, $S_k$ and $S_{k+1}$ or $\bar{x}_k$ and $\bar{x}_{k+1}$ once they are calculated. Equation 413 may be used for indirectly iteratively calculate a Z-score $Z_{k+1}(x_m)$ of $x_m$ once component $\bar{x}_{k+1}$ and $vp_{k+1}$ are calculated.

FIG. 4D illustrates the second example iterative Z-score calculation algorithm (iterative algorithm 2) for iteratively calculating a Z-score based on iteratively calculated components $S_{k+1}$ or $\bar{x}_{k+1}$ and $SSD_{k+1}$. Equation 401 may be used for initially calculating sum $S_k$ of data elements in the first computation subset of size n. Equation 402 may be used for initially calculating mean $\bar{x}_k$ of data elements in the first computation subset. Equation 414 may be used for initially calculating $SSD_k$ in the first computation subset once $S_k$ or $\bar{x}_k$ is calculated. Equation 417 may be used for initially calculating Z-score of $x_m$ in the first computation subset once $SSD_k$ is calculated. Equation 415 is a traditional way for calculating $SSD_{k+1}$ in a modified computation subset. Equation 407 may be used for directly iteratively calculating component $S_{k+1}$ if component $S_k$ is available. Equation 408 may be used for directly iteratively calculating component $\bar{x}_{k+1}$ if component $\bar{x}_k$ is available. Equation 416 may be used for iteratively calculating $SSD_{k+1}$ once components $S_{k+1}$ or $\bar{x}_{k+1}$ and $SSD_k$ are calculated. Equation 418 may be then used for indirectly iteratively calculating Z-score $Z_{k+1}(x_m)$ of $x_m$.

FIG. 4E illustrates the third example iterative Z-score calculation algorithm (iterative algorithm 3) for iteratively calculating a Z-score based on iteratively calculated components $\bar{x}_{k+1}$ and $SS_{k+1}$. Equation 401 may be used for initially calculating sum $S_k$ of data elements in the first computation subset of size n. Equation 402 may be used for initially calculating mean $\bar{x}_k$ of data elements in the first computation subset. Equation 419 may be used for initially calculating $SS_k$ in the first computation subset. Equation 422 may be used for initially calculating Z-score of $x_m$ in the first computation subset once $S_k$ or $\bar{x}_k$ and $SS_k$ are calculated. Equation 420 is a traditional way for calculating $SS_{k+1}$ in a modified computation subset. Equation 407 may be used for directly iteratively calculating component $S_{k+1}$ if component $S_k$ is available. Equation 408 may be used for directly iteratively calculating component $\bar{x}_{k+1}$ if component $\bar{x}_k$ is available. Equations 421 may be used for directly iteratively calculating component $SS_{k+1}$ in the modified computation subset X if component $SS_k$ is available. Equation 423 may be then used for indirectly iteratively calculating a Z-score $Z_{k+1}(x_m)$ of $x_m$ using components $S_{k+1}$, or $\bar{x}_{k+1}$, or $S_{k+1}$ and $\bar{x}_{k+1}$, and $SS_{k+1}$.

FIG. 5A illustrates an example of calculating a Z-score for Big Data Set 501 using traditional algorithms. Computation subset size 502 (n) is 8. Computation subset 503 includes the first eight elements in Big Data Set 501. For each computation subset, equation 402 is used for calculating a mean, then equation 403 is used for calculating a Z-score. For example, for computation subset 503 the mean is calculated to be 4.75. Calculating the mean includes 1 division operation and 7 addition operations. The total number of operations includes 1 square root, 3 divisions, 8 multiplications, 14 additions, and 9 subtractions for calculating the Z-score of $x_8$ using traditional algorithms without any optimization. The data element $x_8$ is chosen just for the purpose of illustrating the computation procedure, and any other data element in the computation subset may be chosen for calculating a Z-score of that data element.

The same equations and steps may be used for calculating the Z-score of $x_8$ for computation subsets 504 and 505 respectively. Again, the data element $x_8$ is chosen just for the purpose of illustrating the computation procedure, and any other data element in the computation subset may be chosen for calculating a Z-score of that data element. Each of these calculations also includes 1 square root, 3 divisions, 8 multiplications, 14 additions, and 9 subtractions for calculating the Z-score of $x_8$ using traditional algorithms without any optimization. Traditional algorithms for calculating a Z-score on n data elements will typically take 1 square root, 3 divisions, n multiplications, 2(n−1) additions, and n+1 subtractions without any optimization.

FIG. 5B illustrates an example of calculating a Z-score using example iterative Z-score calculation algorithm 1. A mean instead of a sum is used for the calculation. The calculations for computation subset 503 are essentially the same as shown in FIG. 5A. There are a total of 1 square root, 3 divisions, 8 multiplications, 14 additions, and 9 subtractions for calculating the Z-score of $x_8$ in computation subset 503.

However, starting from computation subset 504, the Z-score may be iteratively calculated. Equations 408 may be used for directly iteratively calculating component $\bar{x}_2$ for the computation subset 504 based on component $\bar{x}_1$ for the computation subset 503, and equation 411 may be used for directly iteratively calculating the population variance $vp_2$ based on components $vp_1$, $\bar{x}_1$ and $\bar{x}_2$. Equation 411 includes 1 division, 1 multiplication, 3 additions and 2 subtractions. Equation 413 includes 1 square root, 1 division, and 1 subtraction. Thus, the total operations include 1 square root, 3 divisions, 1 multiplication, 4 additions, and 4 subtractions for calculating the Z-score of $x_8$.

Equations 408, 411 and 413 may also be used for iteratively calculating the Z-score for computation subset 505. These calculations also include 1 square root, 3 divisions, 1 multiplication, 4 additions, and 4 subtractions for calculating the Z-score of $x_8$. As such, the number of operations used when iteratively calculating the Z-score is (potentially substantially) less than when using traditional equations.

FIG. 5C illustrates an example of calculating a Z-score using example iterative Z-score calculation algorithm 2. A mean instead of a sum is used in this example. The calculations for computation subset 503 use traditional equations to calculate the initial values of components $\bar{x}_1$ and $SSD_1$. There are 1 square root, 3 divisions, 8 multiplications, 14 additions, and 9 subtractions for calculating the Z-score of $x_8$ in computation subset 503.

However, starting from computation subset 504, the Z-score of $x_8$ may be iteratively calculated. Equations 408 may be used for directly iteratively calculating component $\bar{x}_2$ for the computation subset 504 based on component $\bar{x}_1$ for the computation subset 503, and equation 416 may be used for directly iteratively calculating component $SSD_2$ based on components $SSD_1$, $\bar{x}_1$ and $\bar{x}_2$. Equation 418 may be used for indirectly iteratively calculating the Z-score of $x_8$ based on component $SSD_2$ and $\bar{x}_2$. Equation 416 includes 1 multiplication, 3 additions and 2 subtractions. Equation 418 includes 1 square root, 2 divisions, and 1 subtraction. Thus, the total operations include 1 square root, 3 divisions, 1 multiplication, 4 additions, and 4 subtractions for calculating the Z-score of $x_8$ in computation subset 504.

Equations 408, 416, and 418 may also be used for iteratively calculating the Z-score for computation subset 505 from the components for computation subset 504. These calculations also include 1 square root, 3 divisions, 1 multiplication, 4 additions, and 4 subtractions for calculating the Z-score of $x_8$ in computation subset 505. As such, the number of operations used when iteratively calculating the Z-score is (potentially substantially) less than when using traditional equations.

FIG. 5D illustrates an example of calculating a Z-score using iterative Z-score calculation algorithm 3. A mean instead of a sum is used in this example. The calculations for computation subset 503 use traditional equations to calculate the initial values of components $\bar{x}_1$ and $SS_1$. Equation 402 is used for calculating component $\bar{x}_1$, and equation 419 is used for calculating component $SS_1$. Equation 422 is used for calculating the Z-score of $x_8$. There are 1 square root, 3 divisions, 8 multiplications, 14 additions, and 2 subtractions for calculating the Z-score of $x_8$ in computation subset 503.

However, starting from computation subset 504, the Z-score may be iteratively calculated. Equations 408 may be used for directly iteratively calculating component $\bar{x}_2$ for the computation subset 504 based on component $\bar{x}_1$ for the computation subset 503, and equation 421 may be used for directly iteratively calculating component $SS_2$ for the computation subset 504 based on component $SS_1$ for the computation subset 503. Equation 423 may be used for indirectly iteratively calculating the Z-score of $x_8$ based on components $SS_2$ and $\bar{x}_2$. Equation 408 includes 1 division, 1 addition and 1 subtraction. Equation 421 includes 2 multiplications, 1 addition and 1 subtraction. Equation 423 includes 1 square root, 2 divisions, 1 multiplication, and 2 subtractions. Thus, the total operations include 1 square root, 2 divisions, 3 multiplications, 2 additions, and 4 subtractions for calculating the Z-score of $x_8$ in computation subset 504.

Equations 408, 421, and 423 may also be used for iteratively calculating the Z-score for computation subset 505 from the components for computation subset 504. These calculations also include 1 square root, 3 divisions, 3 multiplications, 2 additions, and 4 subtractions for calculating the Z-score of $x_8$ in computation subset 505. As such, the number of operations used when iteratively calculating the Z-score is (potentially substantially) less than when using traditional equations.

FIG. 6 illustrates computational loads for traditional Z-score calculation algorithms and iterative Z-score calculation algorithms with a computation subset of size 8.

FIG. 7 illustrates computational loads for traditional Z-score calculation algorithms and iterative Z-score calculation algorithms with a computation subset of size 1,000,000.

The present invention may be embodied in other specific forms without departing from its spirit or essential characteristics. The described embodiments are to be considered in all respects only as illustrative and not restrictive.

What is claimed:

1. A computing-system-implemented method for generating a Z-score for a selected data element in a modified computation subset, the method comprising:
   initializing, by a computing-device-based computing system, a sum or a mean or both and one or more other components of a Z-score for a pre-modified computation subset, wherein the pre-modified computation subset contains a specified number, n (n≥6), of data elements of a data set on at least one of one or more storage media in the computing-device-based computing system;
   accessing, by the computing-device-based computing system and from the data set, a data element to be removed from the pre-modified computation subset and a data element from the data set to be added to the pre-modified computation subset;
   modifying, by the computing-device-based computing system, the pre-modified computation subset by:
      removing the to-be-removed data element from the pre-modified computation subset; and
      adding the to-be-added data element to the pre-modified computation subset;
   iteratively deriving, by the computing-device-based computing system, a sum or a mean or both for the modified computation subset;
   directly iteratively deriving, by the computing-device-based computing system and based on the one or more components of the Z-score other than a sum and a mean for the pre-modified computation subset, one or more components of a Z-score other than a sum and a mean for the modified computation subset, wherein the directly iteratively deriving includes:
      accessing the one or more components of the Z-score other than a sum and a mean initialized or derived for the pre-modified computation subset without accessing all data elements in the modified computation subset to allow the computing-device-based computing system to use less memory; and
      removing any contribution of the removed data element from each of the accessed components and adding any contribution of the added data element to each of the accessed components without using all data elements in the modified computation subset thereby resulting in faster computation time;
   accessing, by the computing-device-based computing system, a data element selected for a Z-score calculation; and
   generating, by the computing-device-based computing system, a Z-score for the selected data element in the modified computation subset based on one or more of the iteratively derived components.

2. The computing-system-implemented method of claim 1, wherein the generating a Z-score further comprises indirectly iteratively deriving, by the computing-device-based computing system, one or more components of the Z-score for the modified computation subset, wherein the indirectly iteratively deriving the one or more components includes individually calculating each respective one of the one or more components based on one or more components other than the respective one component.

3. The computing-system-implemented method of claim 1, wherein the accessing a data element to be removed and a data element to be added includes accessing a plurality of z data elements to be removed from the pre-modified computation subset and a plurality of z data elements to be added to the pre-modified computation subset, and wherein the method further comprises, for each of the respective z data elements to be removed and each of the respective z data elements to be added, the modifying the pre-modified computation subset, the iteratively deriving a sum or a mean or both for the modified computation subset, the directly iteratively deriving the one or more components of a Z-score other than a sum and a mean for the modified computation subset, the accessing a data element selected for a Z-score calculation, and the generating a Z-score for the selected data element for the modified computation subset.

4. The computing-system-implemented method of claim 1, wherein the accessing a data element to be removed and a data element to be added includes accessing a plurality of z data elements to be removed from the pre-modified computation subset and a plurality of z data elements to be added to the pre-modified computation subset, and wherein the method further comprises the modifying the pre-modified computation subset, the iteratively deriving a sum or a mean or both for the modified computation subset, the directly iteratively deriving the one or more components of a Z-score other than a sum and a mean for the modified computation subset.

5. A computing system, the computing system comprising:
   one or more processors;
   one or more storage media having stored a data set; and
   one or more calculation modules that, when executed by at least one of the one or more processors, generates a Z-score for a selected data element in a modified computation subset of a specified size of the data set, wherein the one or more calculation modules are configured to:
   a. initialize a sum or a mean or both and one or more other components of a Z-score for a pre-modified computation subset, wherein the pre-modified computation subset contains a specified number, n (n≥6), of data elements of a data set on at least one of the one or more storage media;
   b. access a data element to be removed from the pre-modified computation subset and a data element from the data set to be added to the pre-modified computation subset;
   c. modify the pre-modified computation subset, wherein modification of the pre-modified computation subset includes to remove the to-be-removed data element from the pre-modified computation subset and to add the to-be-added data element to the pre-modified computation subset;
d. iteratively calculate a sum or a mean or both for the modified computation subset;
e. directly iteratively calculate one or more components of a Z-score different from a sum and a mean for the modified computation subset based at least in part on the one or more components of the Z-score different from a sum and a mean for the pre-modified computation subset, wherein direct iterative calculation of the one or more components includes to remove any contribution of the removed data element from each of the one or more components and to add any contribution of the added data element to each of the one or more components without accessing and using all data elements in the modified computation subset to reduce data access latency and the number of operations performed by the computing system, thereby increasing calculation efficiency, saving computing resources and reducing the computing system's power consumption;
f. access a data element selected for a Z-score calculation; and
g. generating a Z-score for the selected data element in the modified computation subset based on one or more of the iteratively calculated components.

6. The computing system of claim 5, wherein the generating a Z-score further comprises to indirectly iteratively calculate one or more components of the Z-score for the modified computation subset, wherein the indirectly iteratively calculating the one or more components includes individually calculating each respective one of the one or more components based on one or more components other than the respective one component.

7. The computing system of claim 5, wherein the one or more calculation modules, when executed by at least one of the one or more processors, perform b, c, d, e, f, and g for a pre-defined number of times or until a predefined condition is met.

8. The computing system of claim 5, wherein the one or more calculation modules, when executed by at least one of the one or more processors, perform b, c, d, and e multiple times until a data element is selected for calculating a Z-score.

9. A computing system program product for implementing a method for generating a Z-score for a selected data element in a modified computation subset, the computing system program product comprising one or more non-transitory computing-device-readable storage media having stored thereon computing-device-executable instructions that, when executed by at least one of one or more configured computing devices in a configured computing system, cause the configured computing system to perform the method, the method including steps to:
initialize a sum or a mean or both for a pre-modified computation subset and one or more other components of a Z-score for the pre-modified computation subset, wherein the pre-modified computation subset contains a specified number, n (n≥6), of data elements of a data set on at least one of one or more storage media in the configured computing system;
access a data element to be removed from the pre-modified computation subset and a data element from the data set to be added to the pre-modified computation subset;
modify the pre-modified computation subset by removing an existing data element from the pre-modified computation subset and adding the data element to the pre-modified computation subset;
iteratively calculate a sum or a mean or both for the modified computation subset;
directly iteratively calculate one or more components of a Z-score different from a sum and a mean for the modified computation subset based at least in part on the one or more components of the Z-score different from a sum and a mean initialized or calculated for the pre-modified computation subset, including to:
access the one or more components of the Z-score different from a sum and a mean initialized or calculated for the pre-modified computation subset without accessing all data elements in the modified computation subset to allow the configured computing system to use less memory; and
remove any contribution of the removed data element from each of the accessed components and add any contribution of the added data element to each of the accessed components without using all data elements in the modified computation subset thereby resulting in faster computation time;
access a data element selected for a Z-score calculation; and
generate a Z-score for the selected data element in the modified computation subset based on one or more of the iteratively calculated components.

10. The computing system program product of claim 9, wherein the generating a Z-score further comprises to indirectly iteratively calculate one or more components of the Z-score for the modified computation subset, wherein the indirectly iteratively calculating the one or more components includes individually calculating each respective one of the one or more components based on one or more components other than the respective one component.

11. The computing system program product of claim 9, wherein the computing-device-executable instructions that, when executed, further cause the configured computing system to access a data element to be removed and a data element to be added, to modify the pre-modified computation subset, to iteratively calculate a sum or a mean or both, to directly iteratively calculate the one or more components different from a sum and a mean, to access a data element selected for a Z-score calculation, and to generate a Z-score for the selected data element in the modified computation subset for each of multiple data elements to be removed from the pre-modified computation subset and each of multiple data elements to be added to the pre-modified computation subset.

12. The computing system program product of claim 9, wherein the computing-device-executable instructions that, when executed, further cause the configured computing system to access a data element to be removed and a data element to be added, to modify the pre-modified computation subset, to iteratively calculate a sum or a mean or both, to directly iteratively calculate the one or more components different from a sum and a mean for each of multiple data elements to be removed from the pre-modified computation subset and each of multiple data elements to be added to the pre-modified computation subset.

13. The computing-system-implemented method of claim 1, wherein the without accessing all data elements in the modified computation subset comprises without accessing any data elements other than the removed data element, the added data element, and the data element selected for the Z-score calculation.

14. The computing-system-implemented method of claim 3, wherein the accessing a data element selected for a Z-score calculation and the generating the Z-score for the selected data element in the modified computation subset comprises accessing a data element selected for a Z-score calculation and generating a Z-score for the selected data element in the modified computation subset only when a data element is selected for Z-score calculation.

15. The computing-system-implemented method of claim 14, wherein the generating a Z-score further comprises indirectly iteratively deriving, by the computing-device-based computing system, one or more components of the Z-score for the selected data element in the modified computation subset, wherein the indirectly iteratively deriving the one or more components includes individually calculating each respective one of the one or more components based on one or more components other than the respective one component.

16. The computing system of claim 5, wherein the without accessing and using all data elements in the modified computation subset comprises without accessing any data elements other than the removed data element, the added data element, and the data element selected for the Z-score calculation.

17. The computing system of claim 7, wherein the steps f and g are performed only when a data element is selected for Z-score calculation.

18. The computing system of claim 17, wherein the performing g comprises indirectly iteratively calculating one or more components of the Z-score for the selected data element in the modified computation subset, wherein indirectly iteratively calculating one or more components includes individually calculating each respective one of the one or more components based on one or more components other than the respective one component.

19. The computing system program product of claim 11, wherein the accessing a selected data element for a Z-score calculation and the generating the Z-score for the selected data element in the modified computation subset comprises accessing a data element selected for a Z-score calculation and generating a Z-score for the selected data element in the modified computation subset only when a data element is selected for a Z-score calculation.

20. The computing system program product of claim 19, wherein the generating the Z-score for the selected data element in the modified computation subset further comprises indirectly iteratively calculating one or more components of the Z-score for the selected data element in the modified computation subset, wherein the indirectly iteratively calculating the one or more components includes individually calculating each respective one of the one or more components based on one or more components other than the respective one component.

* * * * *